United States Patent
Mallette et al.

(10) Patent No.: US 6,860,352 B2
(45) Date of Patent: Mar. 1, 2005

(54) SPINDLE FOR CONVERTABLE SKI STANCE

(75) Inventors: Bertrand Mallette, Rock Forest (CA); René Lemieux, Granby (CA); Mario Côté, Bedford (CA)

(73) Assignee: Bombardier Recreational Products Inc., Valcourt (CA)

( * ) Notice: Subject to any disclaimer, the term of this patent is extended or adjusted under 35 U.S.C. 154(b) by 0 days.

(21) Appl. No.: 10/189,578

(22) Filed: Jul. 8, 2002

(65) Prior Publication Data
US 2003/0019676 A1 Jan. 30, 2003

Related U.S. Application Data

(60) Provisional application No. 60/307,155, filed on Jul. 24, 2001.

(51) Int. Cl.[7] .............................................. B62M 27/02
(52) U.S. Cl. .................................. 180/182; 280/93.512
(58) Field of Search ................................ 180/182, 190; 280/93.512, 28

(56) References Cited

U.S. PATENT DOCUMENTS

| | | | |
|---|---|---|---|
| 3,912,030 A | * | 10/1975 | Payne ........................ 280/21.1 |
| 4,509,766 A | * | 4/1985 | Yasui et al. ................. 280/21.1 |
| 5,029,664 A | | 7/1991 | Zulawski |
| 5,038,882 A | * | 8/1991 | Zulawski ..................... 180/190 |
| 6,311,798 B1 | * | 11/2001 | Anderson .................... 180/182 |
| 6,431,561 B1 | * | 8/2002 | Hedlund ....................... 280/28 |
| 2002/0036387 A1 | * | 3/2002 | Lemieux ....................... 280/28 |

FOREIGN PATENT DOCUMENTS

CA  2392928 A1 * 1/2003 ............ B62D/7/18

OTHER PUBLICATIONS

Magazine Snow Week, Feb. 18, 2002, vol. 29, No. 12, pp. 10 and 11.

* cited by examiner

Primary Examiner—Lesley D. Morris
Assistant Examiner—Daniel Yeagley
(74) Attorney, Agent, or Firm—BRP Legal Services

(57) ABSTRACT

A snowmobile is described having a frame with left and right sides with left and right suspension assembly disposed thereon. Left and right spindles are connected to the left and right suspension assemblies. A left ski is pivotally attached to the left spindle and a right ski is attached to the right spindle. Rotation of the left and right spindles alters the ski stance of the snowmobile. The stance may also be altered in other ways, which are also disclosed.

18 Claims, 18 Drawing Sheets

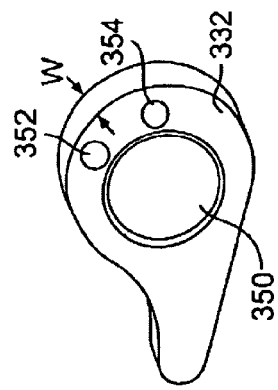
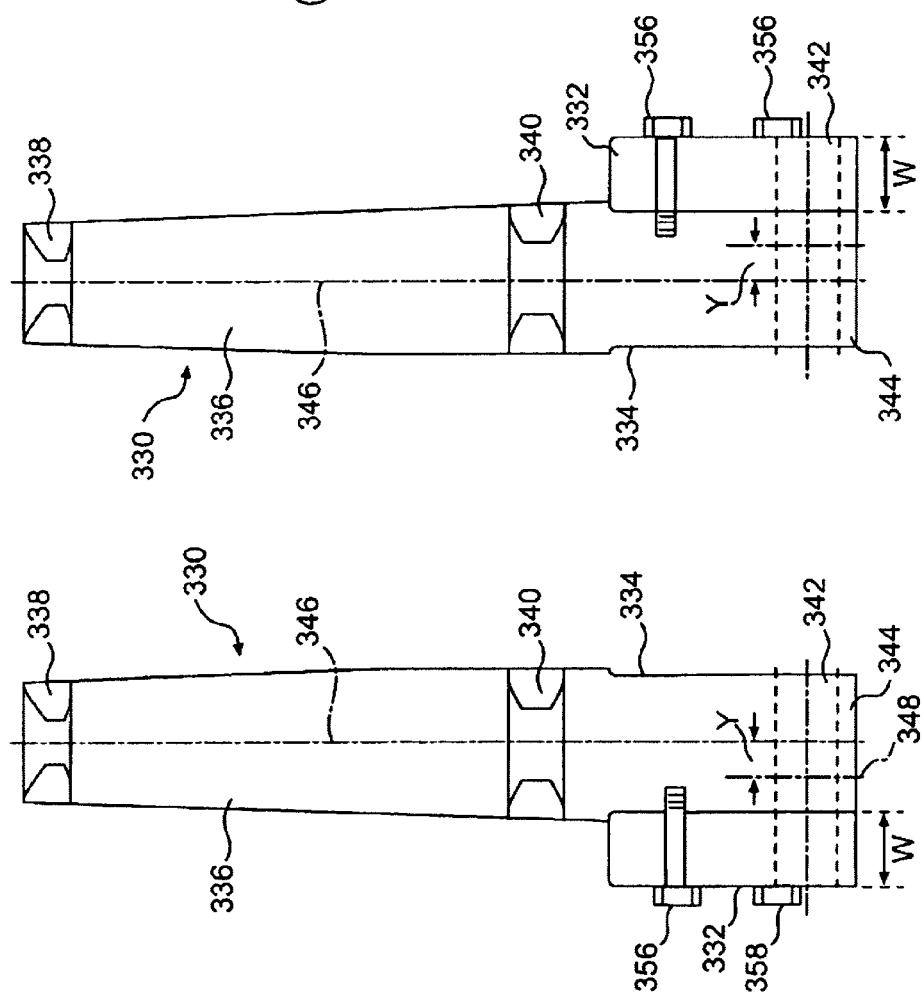

SPINDLE FOR CONVERTABLE SKI STANCE

This application relies for priority on U.S. Provisional Application No. 60/307,155, entitled "SPINDLE FOR CONVERTABLE SKI STANCE," filed on Jul. 24, 2001, the entirety of which is incorporated herein by reference.

BACKGROUND OF THE INVENTION

1. Field of the Invention

This invention concerns the construction of a spindle to which a ski of a snowmobile is attached. In particular, this invention encompasses a spindle construction that facilitates adjustment of the width of the ski stance for a snowmobile (also known as a "sied").

2. Description of Related Prior Art

In the prior art, there are at least two known types of skis. The first is called a single-keel ski because it incorporates a single keel having a single or double carbide runners, which runs along a longitudinal part of the length of the underside of the keel. The second conventional ski is called the dual-keel ski because it incorporates a pair of keels which have carbide runners that extend along longitudinal portions of the undersurface of the snowmobile ski at positions laterally disposed apart from one another. For the second type of ski, the two runners typically are disposed one each on the two lateral edges of the keels.

Most snowmobiles that have been made in the last twenty years have included two skis at the front for turning the vehicle. The ski stance for snowmobiles is determined as the distance (or width) between the two skis. In particular, where a snowmobile is provided with a pair of single-runner skis, which is the more common example to date, the ski stance is measured as the distance (or width) between the carbide runners at the bottoms of the skis. In the case of a snowmobile fitted with a pair of dual-runner skis, the stance is measured as the distance between the centerlines of the skis (or some other suitable convention).

Conventionally, snowmobiles are manufactured with a pre-set ski stance. Depending on the type of terrain in which the snowmobile is used, the pre-set ski stance may have either a positive or a negative effect on the performance of the snowmobile.

As a general rule, there are two basic types of riding conditions for snowmobiles. Each of these two riding conditions places different demands on the snowmobile. Accordingly, each requires a different ski stance.

The first type of riding condition is the groomed trail. Groomed trails include a base of compacted snow, generally with a layer of loose snow above the compacted snow. Because the groomed trail has a solid, compacted base layer, the carbide runners on the bottoms of the snowmobile skis are generally always in contact with the compacted surface. The carbide runners, therefore, provide the edge upon which a turn may be executed. For maximum stability of the snowmobile on a groomed trail, the ski stance is usually pre-set to the widest distance possible. The maximum width of the snowmobile, set by SSCC (Snowmobile Safety Certification Committee), a safety group in the United States, is 48 inches. Generally, the maximum width is set so that snowmobiles do not interlock skis when passing one another on groomed trails.

The second type of riding condition, which is antithetical to the first, is mountain terrain. Mountain snowmobiling differs considerably from snowmobiling on groomed trails because the snow is generally loose, powder snow, which is often deeper than the height of the skis. In other words, in mountain conditions, the bottoms of the skis almost never touch the ground. Therefore, the carbide runners do not assist in turning the vehicle as much as when on groomed trails.

In mountain snowmobiling, it is the preferred practice to keep the ski stance to the smallest width possible. A small ski stance facilitates side hilling of the snowmobile. Side hilling is a technique used by mountain snowmobilers to climb the side of a mountain. The technique requires riders to traverse the mountain diagonally, thus, requiring riders to lean the snowmobile into the surface of the mountain to keep the snowmobile in a substantially horizontal position while crisscrossing the selected mountain area. In order to facilitate leaning of the snowmobile, it is preferred to decrease the distance between the ski and the frame (also referred to as the "tunnel") of the snowmobile. This decreases the moment applied to the snowmobile by the ski. It also permits the snowmobile to get closer to the side of the mountain. In mountain snowmobiling, snowmobiles usually traverse wooded areas. Therefore, a narrow ski stance is particularly advantageous, because riders may pass more easily between trees and other obstacles not encountered on groomed trails.

Since the stances for mountain and trail riding conditions are so different from one another, manufacturers currently manufacture different snowmobiles specifically tailored to the specific environment in which they are to be used. Groomed trail snowmobiles are manufactured with the widest stance permissible by the SSCC in order to maintain maximum stability. Mountain snowmobiles, on the other hand, are manufactured with as narrow a stance as possible to facilitate side hilling and also retain the necessary balance of the vehicle while riding.

Because the two types of snowmobiles have such different stances, the average consumer faces a dilemma when purchasing a snowmobile. Purchasers who desire a snowmobile that will handle optimally both on groomed trails and on mountain terrain will not find such a vehicle commercially available. In addition, purchasers located in areas where there is significant snowfall and few trails, while they may require a mountain snowmobile to navigate local conditions, may not desire a snowmobile designed specifically for climbing hills and mountains. For consumers that live in heavy snowfall areas and do not necessarily engage in mountain climbing but do engage off-trail riding, a higher degree of stability can be achieved by increasing the narrow stance of a conventional mountain sled.

One way to alter the ski stance of a conventional snowmobile is to increase or decrease the distance between the frame and the spindle holder by altering the length of the lower arm assembly and the upper arm assembly, both of which attach the spindle holder to the frame. Although this alters the ski stance of the snowmobile, such a modification requires realignment of the steering rod and the stabilizer bar. This modification also necessitates readjustment of the shock assembly because of the many parts that individually connect to the arm at a predetermined distance from the frame.

As will be appreciated by those skilled in the art, while it is possible to modify a snowmobile's stance, it is not possible to do so at present without significant effort.

A need has, therefore, arisen for a snowmobile ski spindle, which offers a quick and easy way to convert a snowmobile's ski stance without having to re-adjust other parameters of the snowmobile's front suspension system.

SUMMARY OF THE INVENTION

It is, therefore, an aspect of the present invention to provide an improvement upon the current design for a snowmobile spindle arrangement.

According to one aspect of the present invention, the spindle facilitates altering the stance of a snowmobile without having to significantly rework or replace the snowmobile's suspension.

It is another aspect of the present invention to provide spindle for a snowmobile having an upper portion which defines an axis of rotation and a lower portion which defines a pivot axis, wherein the axis of rotation is offset from the midpoint of the lower portion.

Yet another aspect of the present invention is to provide a spindle having removable spacer. The removable spacers can be placed on the right or left side of the spindle to create an offset to the side on which the spacer is attached.

It is another aspect of the present invention to provide a snowmobile with a spindle, which can be rotated to alter the ski stance.

It is yet another aspect of the present invention to provide a snowmobile with a spindle, which can be placed on the opposite side of the snowmobile to alter the ski stance. In other words, one aspect of the present invention is to provide a snowmobile with interchangeable spindles.

It is still yet another aspect of the present invention to provide a snowmobile with a ski including a symmetrical axis, wherein the axis or rotation of the spindle is offset from the symmetrical axis of the ski.

It is another aspect of the present invention to provide a snowmobile with a ski including a runner having a longitudinal axis attached to the underside of the ski, wherein the axis of rotation of the spindle is offset from the longitudinal axis of the runner.

Other aspects of the present invention will be made apparent from the detailed description that follows.

BRIEF DESCRIPTION OF THE DRAWINGS

As would be recognized by one skilled in the art, a snowmobile has a front, a left side, and right side and a rear when viewed by an individual sitting on the vehicle facing the direction of vehicle travel. Where reference is made to one side of the vehicle, it is to be assumed the opposite side is its mirror image unless otherwise specified.

Reference will be made hereinafter to the accompanying drawings, which illustrate embodiments of the present invention discussed herein below, wherein:

FIG. 16 is a front view of a first alternative embodiment of the ski leg of the present invention;

FIG. 17 is a front view of a second alternative embodiment of the ski leg of the present invention;

FIG. 18 is a left rear perspective view of a spacer of the ski leg of the present invention;

DETAILED DESCRIPTION OF THE INVENTION

Through out the description of the several embodiments of the present invention, reference will be made to various elements, the construction of which is readily known to those skilled in the art. Accordingly, an exhaustive description of each and every component is not provided, only description of those elements required for an understanding of the present invention.

Figure 1:
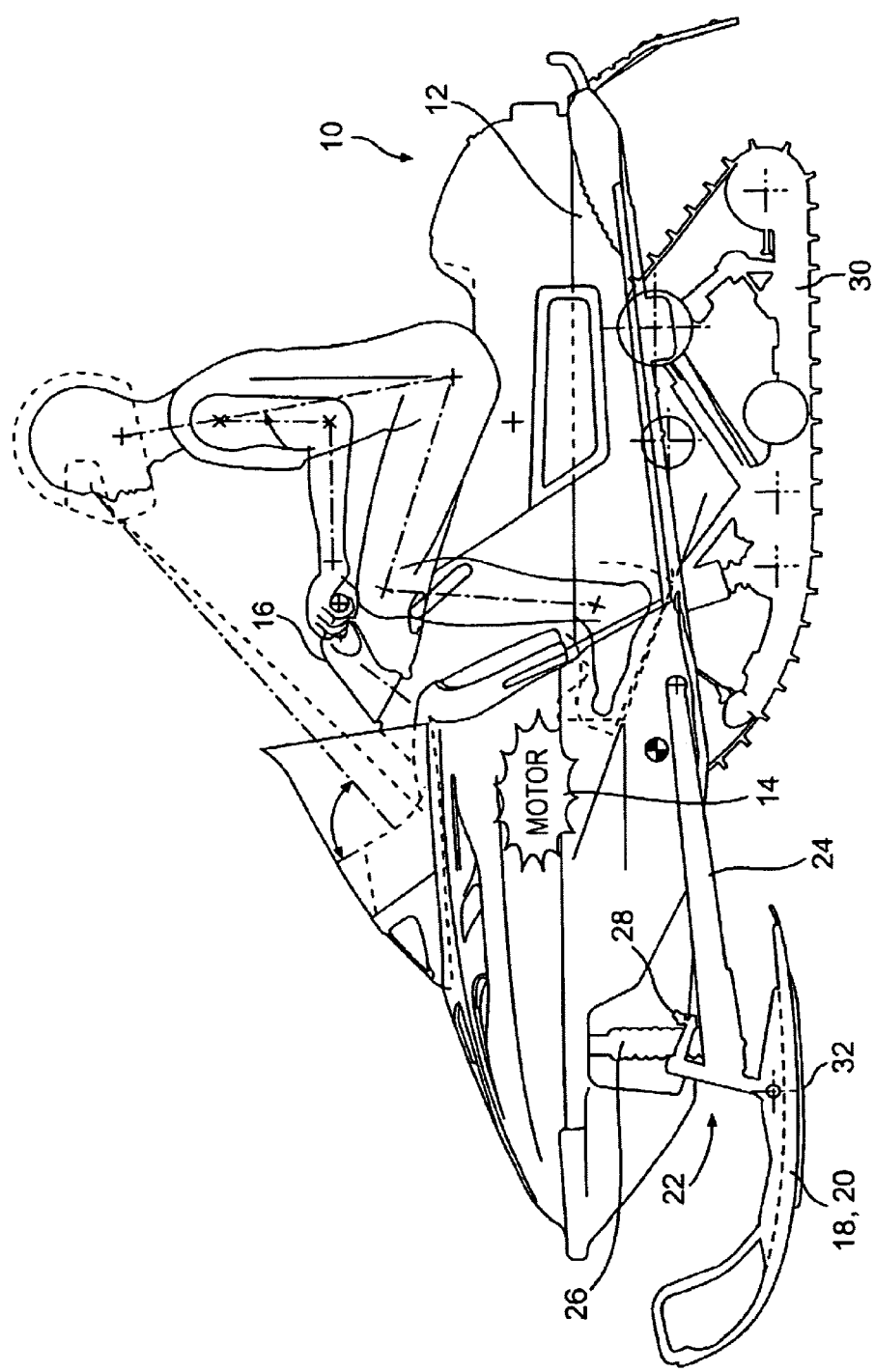
FIG. 1 is a left side schematic view of a first conventional snowmobile manufactured by Bombardier Inc., of Montreal, Quebec, Canada.

FIG. 1 illustrates a conventional snowmobile 10, which is manufactured by Bombardier Inc. of Montreal, Quebec, Canada. While only the left side of the snowmobile 10 is illustrated, those skilled in the art would readily appreciate that the right side is essentially a mirror image thereof.

The snowmobile 10 is constructed with a frame 12 powered by a motor 14. The motor 14 preferably is an internal combustion engine, which may be one of either the two-stroke or four-stroke variety. Handlebars 16 are disposed above and to the rear of the motor 14. The handlebars 16 are operatively connected to two skis 18, 20 disposed at the front of the snowmobile 10. When turned by the handlebars 16, the skis 18, 20 turn the snowmobile 10 in the desired direction.

The skis 18, 20 are suspended from a front suspension 22. The front suspension 22 includes, among other components, two arms 24, one disposed on either side of the snowmobile 10. The arms 24 are connected to shock assemblies 26. To turn the skis 18, 20, the handlebars 16 are connected thereto via a steering rod 28 or some other suitable connector.

The motor 14 is operatively connected to an endless track 30 at the rear of the snowmobile 10 beneath the frame 12. The endless track 30 propels the snowmobile 10 forward (or in reverse, as the case may be).

So that the skis 18, 20 turn the snowmobile 10 effectively as it is propelled forward by the endless track 30, the skis 18, 20 each are provided with one or more runners 32 (or wear bars). The runners 32 extend along a portion of the undersides of the skis 18, 20 and come into contact with the ground. The runners 32 typically are made of a wear-resistant material such as steel. To further increase the wear-resistance of the runners 32, they are often provided with carbide edges. Other constructions of the runners may be used without departing from the scope of the present invention.

Figure 2:
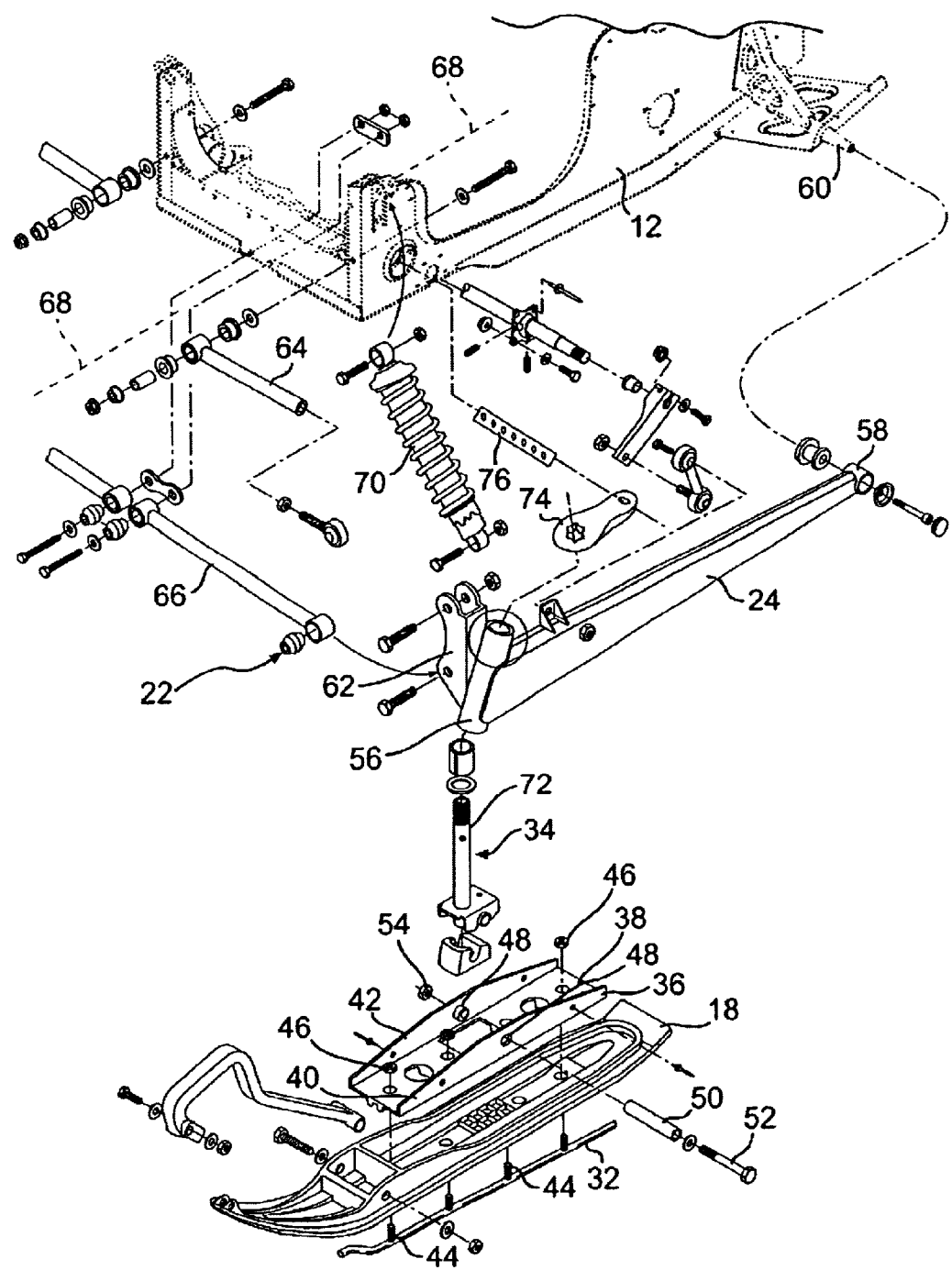
FIG. 2 is an exploded, perspective illustration of the front suspension typically included on the snowmobile illustrated in FIG. 1.

As illustrated in FIG. 2, a spindle 34 connects to the left ski 18 through a bridge 36. The bridge 36 typically is an elongated U-shaped structure with a bottom portion 38 connected to two upwardly extending side portions 40 and 42. The bottom portion 38 of the bridge 36 is adapted to fit onto the ski 18 and is held in place with the studs 44 that are integrally connected to the runner 32. In the example illustrated, the studs 44 extend upwardly from the runner 32, pass through the ski 18, and the bottom portion 38 of the bridge 36. The ski 18 is fastened between the bridge 36 and the runner 32, and the three components remain connected to one another via the bolts 46 that engage the studs 44.

As illustrated in FIG. 2, the side portions 40 and 42 of the bridge 36 include holes 48 at essentially the same position on each respective side. The spindle 34 connects to the bridge 36 via a spacer 50, a bolt 52 and a nut 54. The spacer 50 extends through the bottom portion of the spindle 34. The bolt 52 extends through the spacer and the holes 48 and connects the bridge 36 and the spindle 34 together. The spacer 50 is slightly longer in length than the width of the bottom portion of the spindle 34 and is disposed between the two side portions 40 and 42 of the bridge 36. Accordingly, when tension is applied to the nut 54 and bolt 52, the sides of the bottom portion of the spindle 34 do not come into tight contact with the side portions 40 and 42 of the bridge 36 to prevent rotation therebetween.

As also illustrated in FIG. 2, the spindle 34 and ski 18 are attached to the snowmobile front suspension 22 via a spindle holder 56. The spindle holder 56 is attached at a forward portion of the arm 24. The rear portion of the arm 24 is connected to the frame 12 via a pivot collar 58 and pin 60. Connecting the arm 24 to the frame 12 of the snowmobile 10 in this manner serves at least two functions. First, the pivot collar 58 permits the arm 24 to pivot upwardly and downwardly, which allows the ski 18 to move up and down as the snowmobile 10 traverses the ground. The pivot collar 58 also holds the ski 18 in a fixed relation to the frame 12 so that the ski 18 does not move rearwardly during operation of the snowmobile 10.

The forward portion of the arm 24, at the location of the spindle holder 56, includes a bracket 62. The bracket 62 is operatively connected to the frame 12 via upper and lower arm assemblies 64 and 66. The upper and lower arm assemblies 64, 66 serve at least two functions. First, the upper and lower arm assemblies 64, 66 permit the arm 24 to pivot about the pivot collar 58. This, in turn, permits the spindle 34 and ski 18 to move up and down with respect to the frame 12. Second, the upper and lower arm assemblies 64, 66 maintain the spindle 34 and ski 18 in a fixed lateral position with respect to a centerline 68 of the snowmobile 10. In other words, the upper and lower arms 64, 66 prevent the ski 18 from collapsing laterally inward toward the centerline 68 of the snowmobile 10 during operation.

To cushion the forces experienced by the ski 18 as it traverses the ground (so that the forces are not transmitted to the rider), a shock absorber 70 connects the bracket 62 to the frame 12. The shock absorber 70 ensures that the frame 12 remains disposed above the ground. It also dampens any shocks encountered when the snowmobile 10 encounters rough terrain.

As shown in FIG. 2, the stem 72 of the spindle 34 extends vertically through the spindle holder 56. The stem 72 is rotatably disposed within the spindle holder 56 and permits the spindle 34 to turn relative to the centerline 68 of the snowmobile 10. The top of the stem 72 extends above the top portion of the spindle holder 56. The top of the stem 72 includes a serrated portion 90 that engages with a steering arm 74. The steering arm 74, in turn, is connected to a steering bar 76 that is operatively connected to the handlebars 16.

Figure 3:
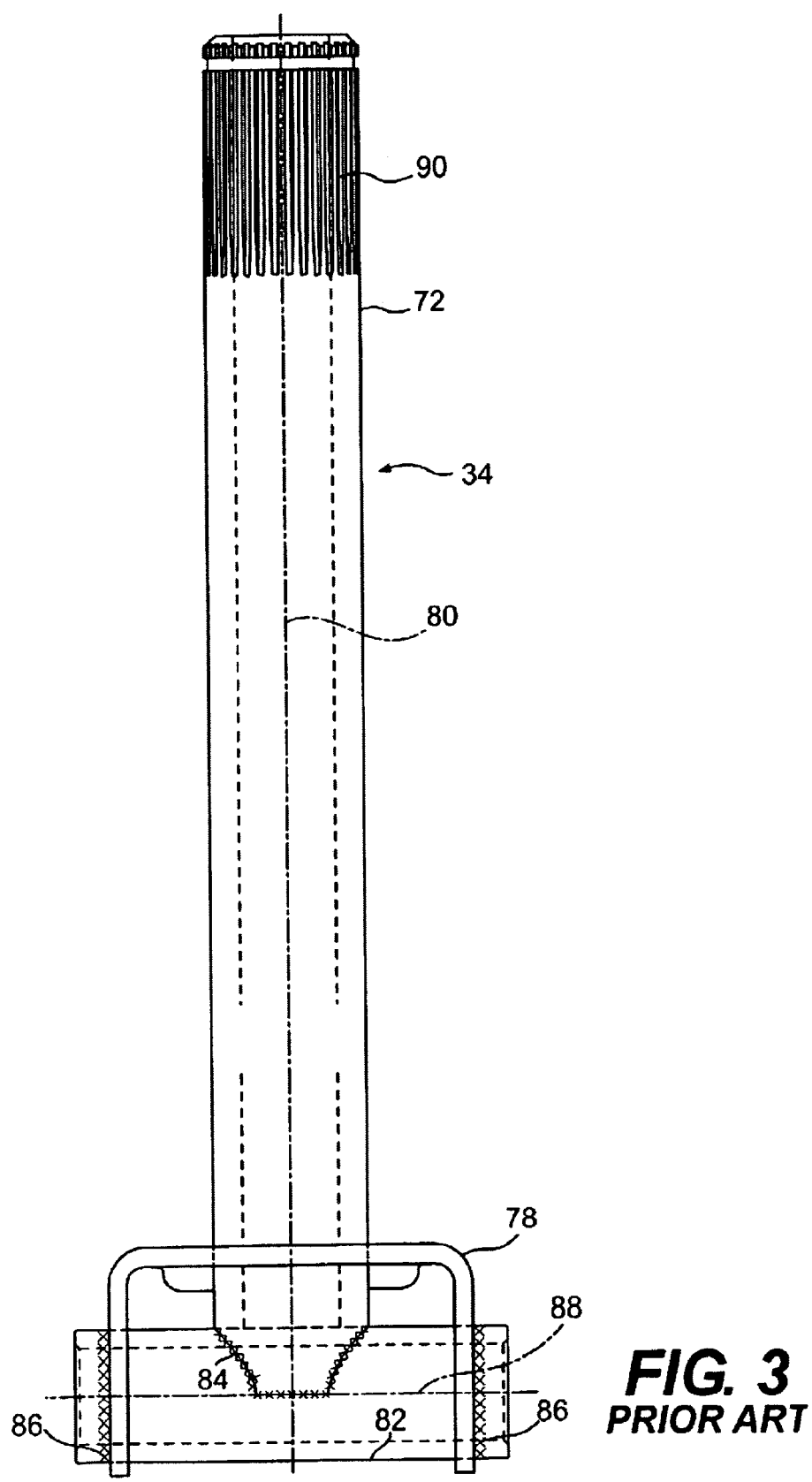
FIG. 3 is a front view of the spindle conventionally included in the front suspension illustrated in FIG. 2.

An enlarged detail of the spindle 34 shown in FIG. 2 is provided in FIG. 3. The spindle 34 includes a bottom bracket 78 and a stem 72 extending upwardly therefrom. The stem 72 defines an axis of rotation 80 along the longitudinal length thereof. The stem 72 and bracket 78 connect to a tubular member 82. The stem 72, bracket 78, and tubular member 82 are preferably made of a metallic material, such as steel, aluminum, or the like. The stem and tubular member 82 are shown with a circular cross-section.

As illustrated, the stem 72 connects to the tubular member 82 via a weld 84. Similarly, the bracket 78 connects to the tubular member 82 via welds 86. The axis of rotation 80 of the stem 72 is essentially perpendicular to the central axis 88 of the tubular member. A serrated portion 90 is provided at the top of the stem 72 so that the stem may engage the steering arm 74. The number of serrations is an odd number.

Figure 4:
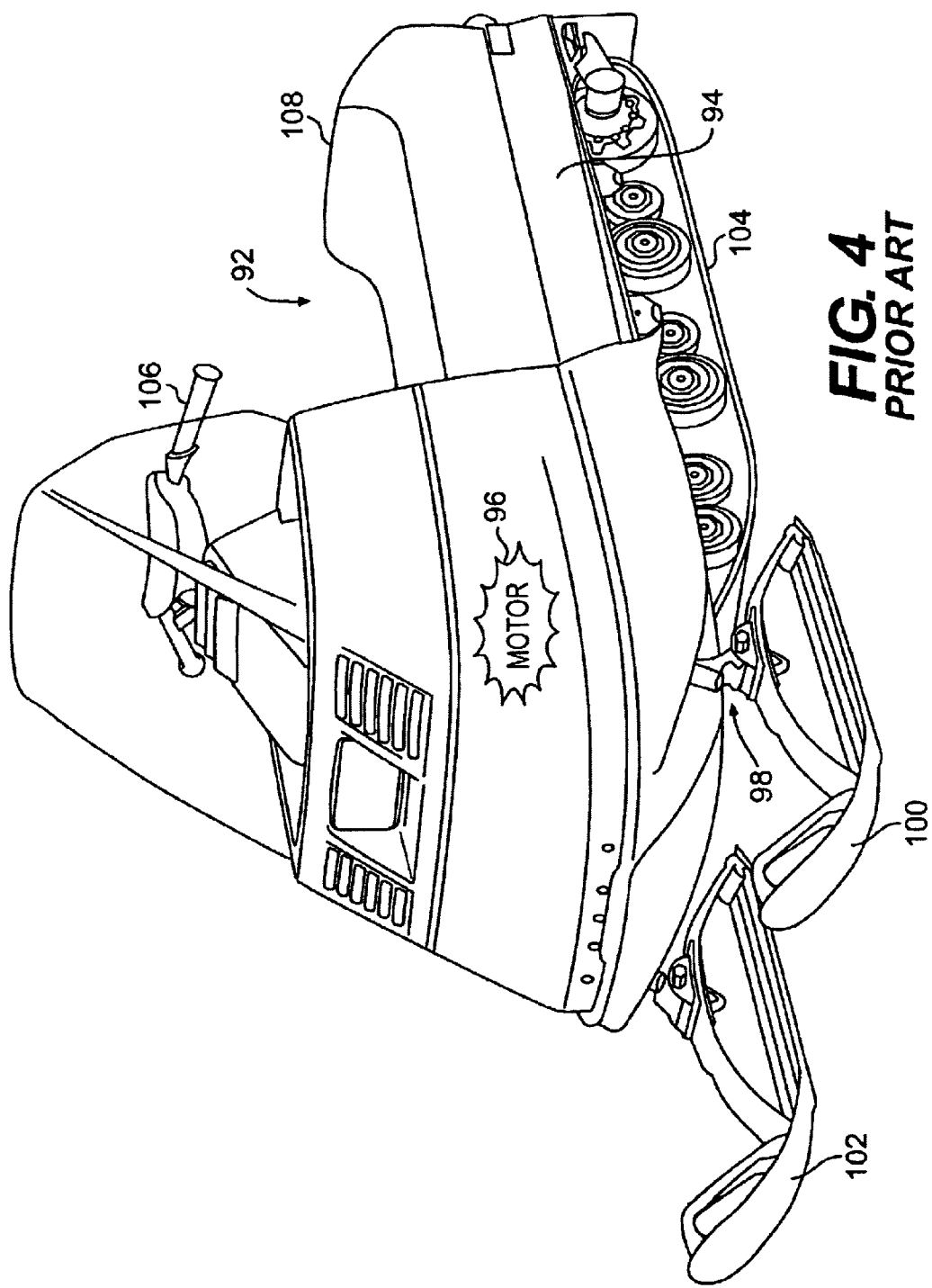
FIG. 4 is a left front perspective view of a second conventional snowmobile, called the "Elan," manufactured by Bombardier Inc., of Montreal, Quebec, Canada.

A second snowmobile 92 known in the prior art is illustrated in perspective view in FIG. 4. The snowmobile 92 was manufactured by Bombardier Inc. of Montreal, Quebec, Canada under the name "Elan."

The snowmobile 92 includes a frame 94 powered by an engine 96 (shown schematically). The frame 94 includes a front suspension 98 from which left and right skis 100, 102 are suspended. An endless track 104 is positioned beneath the frame 94 and is powered by the engine 96. Handlebars 106 are positioned in front of a seat 108 and behind the engine 96. As in the previous snowmobile 10, the handlebars 106 are operatively connected to the skis 100, 102 so that, when the handlebars 106 are turned, the skis 100, 102 rotate to turn the snowmobile 92.

Figure 5:
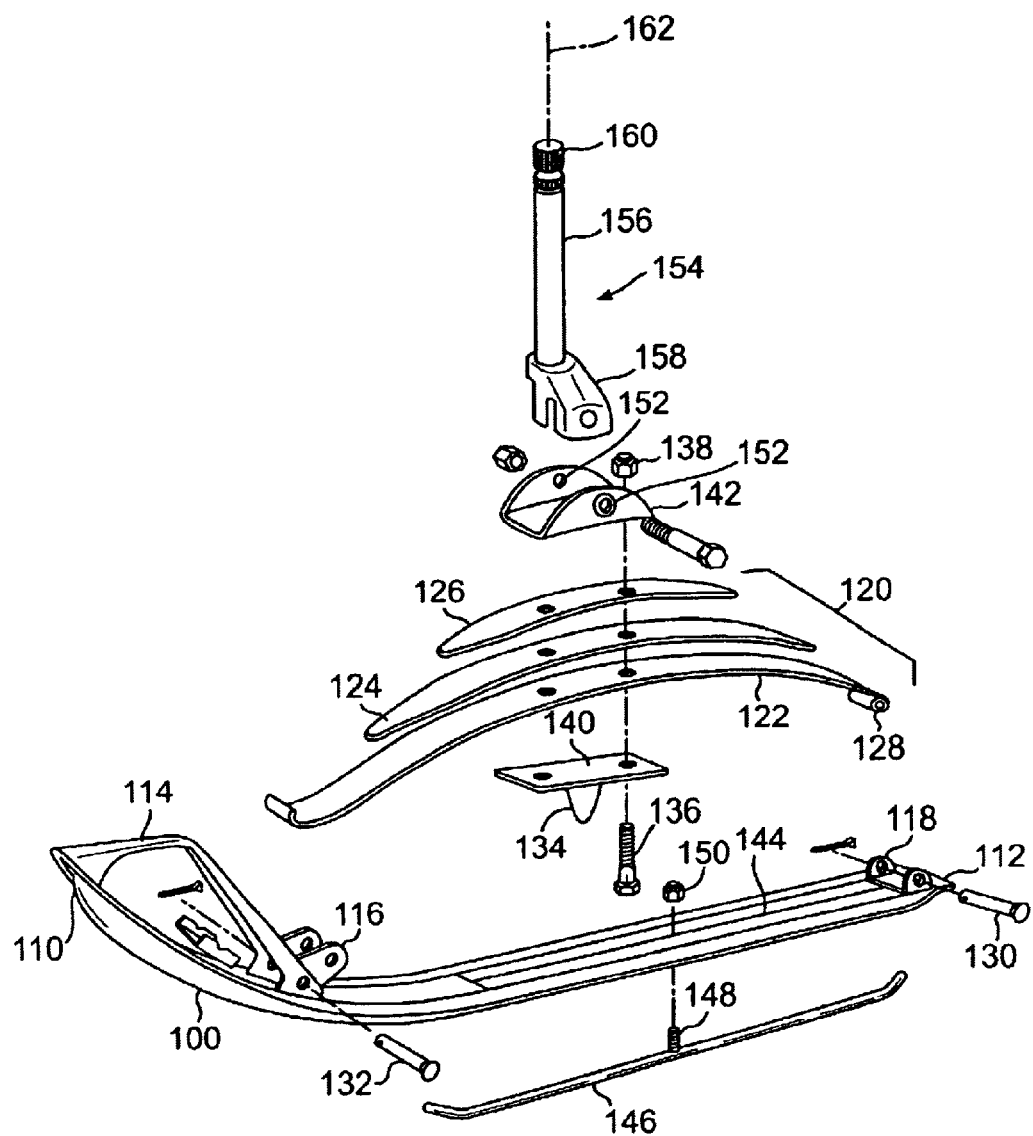
FIG. 5 is an exploded, perspective view of the typical spindle and ski arrangement included on the snowmobile illustrated in FIG. 4.

FIG. 5 illustrates the ski 100 of the snowmobile 92 in greater detail. The ski 100 has a forward end 110 and a rearward end 112. The forward end 110 includes a handle 114. The handle 114 includes a bracket 116. At the rearward end 112 of the ski 100, there is a second bracket 118. A leaf spring assembly 120, comprising at least three stacked springs 122, 124, 126, extends between the brackets 116, 118.

In this snowmobile 94, which is considerably older than the snowmobile 10 illustrated in FIG. 1, there is no shock absorber to cushion the forces experienced by the skis 100, 102 as the snowmobile 92 traverses the ground. The leaf spring assembly 120 functions as the shock absorber for each side of the snowmobile 92.

As illustrated in FIG. 5, the leaf spring 122 includes an eyelet 128 that is rotationally connected to the bracket 118 via a pin 130. The pin 130 affixes the leaf spring 122 to the ski 100. Since the leaf spring assembly 120 must be permitted to flex and, therefore, absorb the force of obstacles encountered by the ski 100, the front end of the leaf spring assembly 120 is not connected to the ski 100. Instead, the front end of the leaf spring assembly 120 is disposed beneath the pin 132 extending through the bracket 116 at the rear end of the handle 114. As the leaf spring assembly 120 compresses, the forward end of the assembly 120 slides forward under the pin 132.

A bumper 134 is disposed beneath the leaf spring assembly 120. The bumper 134 connects to the leaf spring assembly 120 through the nut 136 and bolt 138 that extends below the guide plate 140, the leaf springs 122, 124, 126 and the bracket 142. The bumper 134 is a resilient member that is disposed above the indentation 144 in the ski 100. As the leaf spring assembly 120 expands and contracts, the bumper 134 prevents the leaf spring assembly 120 from metal to metal contact with the ski 100.

The ski 100 includes a runner 146, much in the same way as the ski 18 on the snowmobile 10. In this case, however, the ski 100 is preferably made from a metal such as steel. In addition, the runner 146 attaches to the ski via a stud 148 connected thereto. The stud 148 passes through the ski 100 and is connected thereto via a bolt 150.

The bracket 142 is disposed at the top of the leaf spring assembly 120. The bracket 142 is U-shaped and includes two holes 152. A spindle 154 connects to the bracket 142 so that the spindle 154 may rotate with respect thereto. The spindle includes a stem 156, a bottom portion 158, and a serrated top portion 160 with an odd number of serrations.

The serrated top portion 160 of the stem 156 connects with a steering arm (not shown) so that rotation of the handlebars 106 translates into rotation of the spindles 154 (and, accordingly, the skis 100, 102). The bottom portion 158 of the spindle 154 provides an offset connection between the axis 162 of the spindle 154 and the longitudinal axis of the ski 100. This is necessary because the frame 94 of the snowmobile 92 is disposed so close to the spindles 154 that an additional lateral distance is needed to ensure that the skis 100, 102 move freely when actuated by the handlebars 106.

Figure 6:
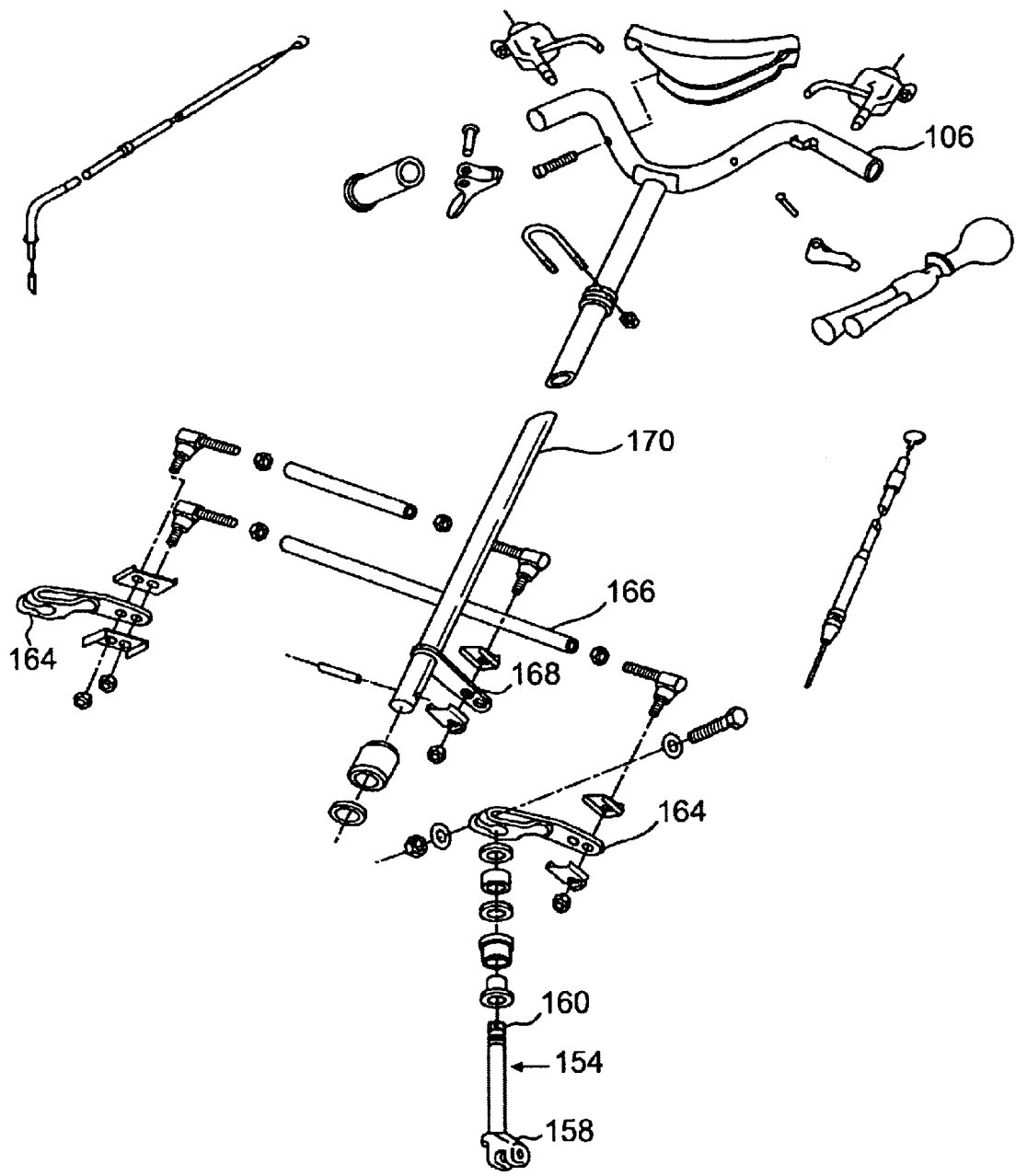
FIG. 6 is an exploded view of the spindle illustrated in FIG. 5, shown together with elements of the steering mechanism for the conventional snowmobile illustrated in FIG. 4.

FIG. 6 illustrates the operative connection between the spindle 154 and the handlebars 106. The spindles connect to a steering arm 164 via the serrated top 160. The steering arm 164, in turn, connects to a steering rod 166. The steering rod 166 is connected, via a linkage 168, to the steering column 170. As shown, the steering column 170 connects to the handlebars 106.

As discussed in the Background of the Invention, above, the prior art does not include any way to conveniently modify the ski stance for a snowmobile, whether snowmobile 10 or its predecessor, snowmobile 92. For snowmobile 10, the axis 80 of the spindle 34 is the same as the axis for the ski 18. Accordingly, nothing could be done with the spindles 34 to alter the stance of the snowmobile 10.

The same is true for the snowmobile 94. While the bottom portion 158 of the spindle 154 provided an offset for the ski 100, the purpose of the offset was to dispose the skis 100, 102 a slightly greater distance from the frame 94 than was possible with the spindles 154 alone. This was necessary for the skis 100, 102 to avoid hitting the frame 94 (or other parts of the snowmobile 92) when turned by the handlebars 106. Changing the stance of the skis 100, 102 was not considered as a option at the time that snowmobile 94 was manufactured. Moreover, given the tolerances involved, changing the ski stance was not possible on the snowmobile 92.

Swapping the spindles 154 on the right and left sides of the snowmobile 92 for one another was not possible. As mentioned, the bottom portions 158 of the spindles 154 provided for a wider ski stance because the skis 100, 102 were disposed close to the frame 94. Accordingly, if the skis 100, 102 were swapped for one another, the clearance problem would have been amplified. This would have further interfered with the steerability of the snowmobile 92. This result would have been antithetical to proper operation of the snowmobile 92.

As mentioned above, a deficiency in the prior art lies in the inability of the average consumer to modify the ski stance for a snowmobile to convert the vehicle from groomed trail use to mountain use (or deep powder use). The prior art offers no solution to this problem.

The inventors realized that a simple solution to the problem of an apparently inalterable ski stance lies in an alteration of the design of the spindle on which the ski is disposed.

Figure 7:
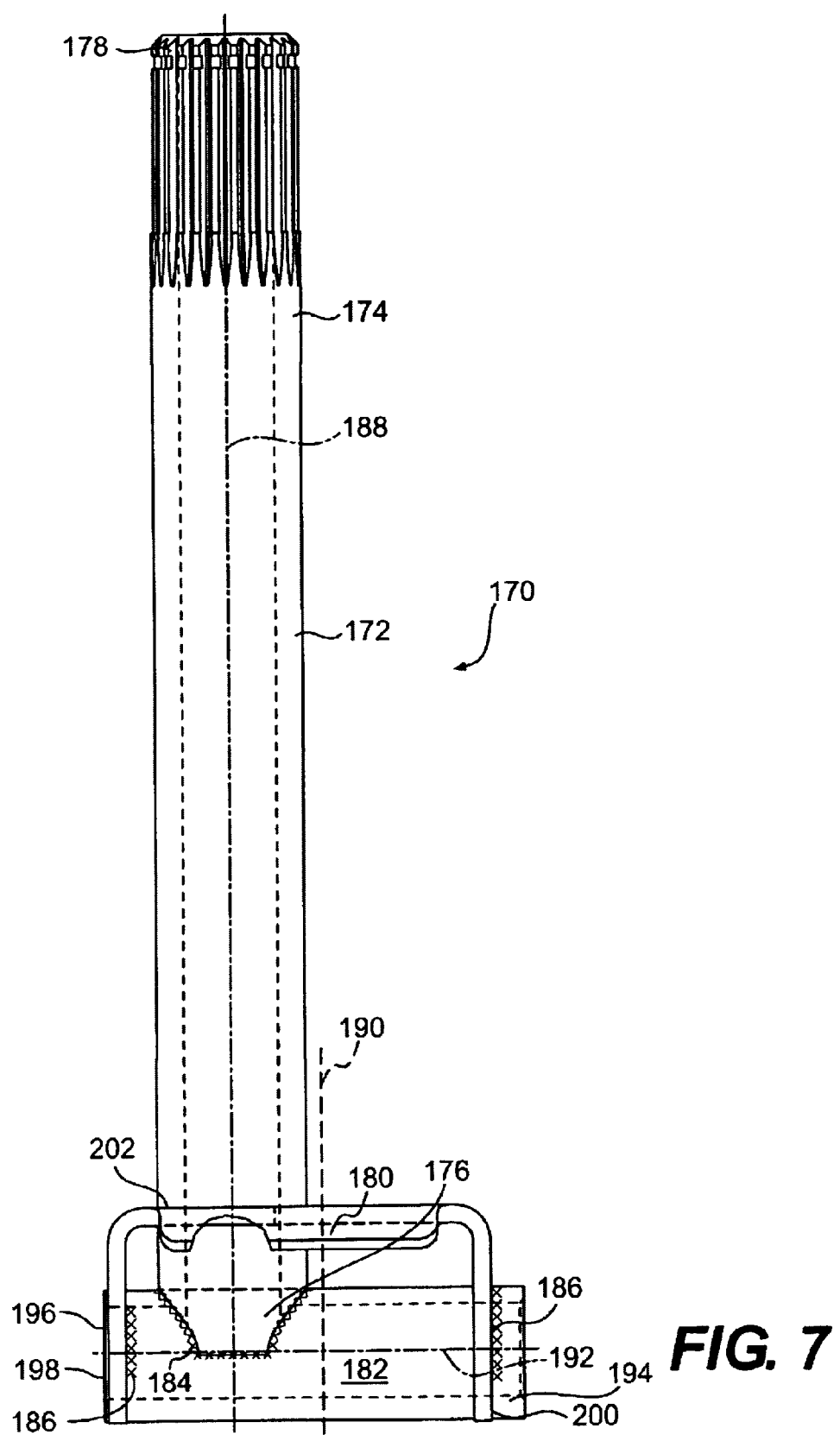
FIG. 7 is a front view of a first embodiment of the spindle of the present invention.

FIG. 7 illustrates a first example of an offset spindle 170 according to the present invention. The offset spindle 170 is specifically designed to modify the stance of snowmobiles like that of snowmobile 10.

The offset spindle 170 includes a stem 172 with a top portion 174 and a bottom portion 176. The top portion 174 includes an even number of serrations 178. The bottom portion 176 includes a bracket 180 and a tubular member 182. The tubular member 182 is connected to the bottom portion 176 via a weld 184. The tubular member 182 is also connected to the bracket 180 via welds 186.

In the embodiment of the spindle 170 illustrated in FIG. 7, the axis of rotation 188 of the stem 172 is offset from the transverse centerline 190 of the tubular member 182. The transverse centerline 190 of the tubular member 182 is the axis that coincides with the centerline of the ski 100 on which the spindle 172 is disposed when the ski is symmetrical. As illustrated, the axis of rotation 188 of the stem 172 is disposed perpendicularly to the axis 192 of the tubular member 182.

As discussed above, the top portion 174 of the stem 172 includes serrations (or splines) 178. The serrations 178 mate with a steering arm, such as the steering arm 74 illustrated in FIG. 2. Preferably, the top portion 174 includes an even number of splines 178 to permit rotation of spindle 170 by 180 degrees about the axis of rotation 188. As would be appreciated by those skilled in the art, without an even number of splines, rotation of the spindle 170 through 180 degrees about the axis of rotation 188 would not be possible.

The connection of the bracket 180 to the tubular member 182 is such that the longitudinal axis 188 (or the axis of rotation 188), of the stem 172 is off set from the transverse centerline 190. Transverse centerline 190 is situated midway between the first end 194 and the second end 196 of the tubular member 182. The first end 194 and the second end 196 are placed between side portions of a bridge such as that shown in FIG. 2. As known in the art, a bridge such as that shown in FIG. 2 may not be necessary and the first end 194 and the second end 196 may be placed between side portion of the ski only. In the preferred embodiment, the axis of rotation 188 is offset between about 0 to 25 mm from the transverse centerline 190. Still more preferably, the offset is between about 5 to 20 mm. Most preferably, the offset is about 16 mm. The stem 172, bracket 180, and tubular member 182 are all preferably made of steel. The stem 172 and tubular members 182 preferably have hollow circular cross-sections. However, as would be appreciated by those skilled in the art, the spindle 170 could be made with hollow or solid members having non-circular cross-sections. Moreover, the stem 172, bracket 180, and tubular member 182 may be made from any other suitable material other than steel. For example, aluminum could be substituted therefor without deviating from the scope of the present invention. Also, stem 172 and member 182 could be one integral part.

The bracket 180 provides structural rigidity to the connection between the stem 172 and the tubular member 182. The bracket 180 has an elongated inverted U-shape with holes 198, 200, 202 therethrough. The lower end 176 of the stem 172 passes through hole 202 in the top of the bracket 180. The first end 194 of the tubular member 182 passes through the hole 200 in the side of the bracket. The second end 196 of the tubular member 182 passes through the remaining hole 198. In the preferred embodiment, the bracket 180 is made of steel. However, as one skilled in the art would know, any suitable material could be used, as long as it is compatible with the material used to construct the stem 172 and the tubular member 182.

Figure 8:
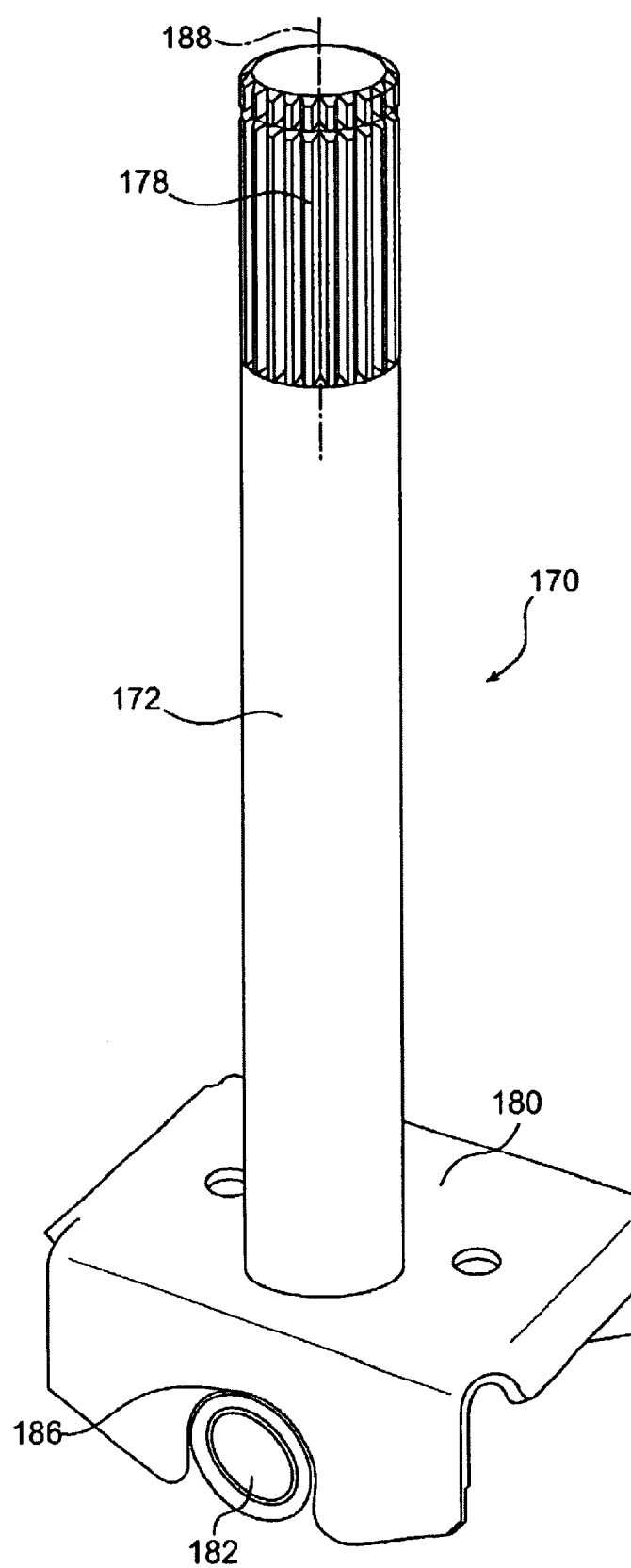
FIG. 8 is a perspective side view of the spindle illustrated in FIG. 7.

FIG. 8 provides a perspective illustration of the spindle 170 shown in FIG. 7. FIG. 8 provides additional information to understand the construction of the spindle 170.

Figure 9:
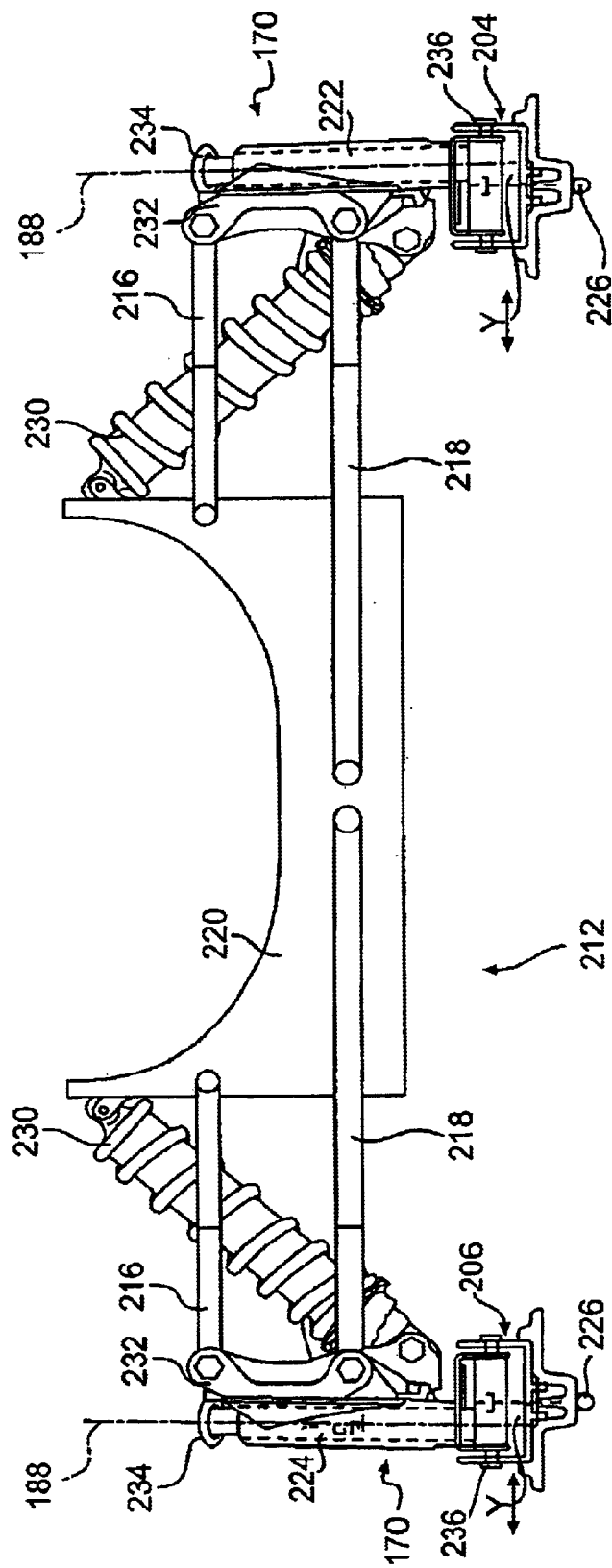
FIG. 9 is a cross-sectional view of a first orientation of a first variation of the first embodiment of the present invention, shown installed on the front suspension of a snowmobile together with a first variation of a pair of skis attached thereto.
Figure 10:
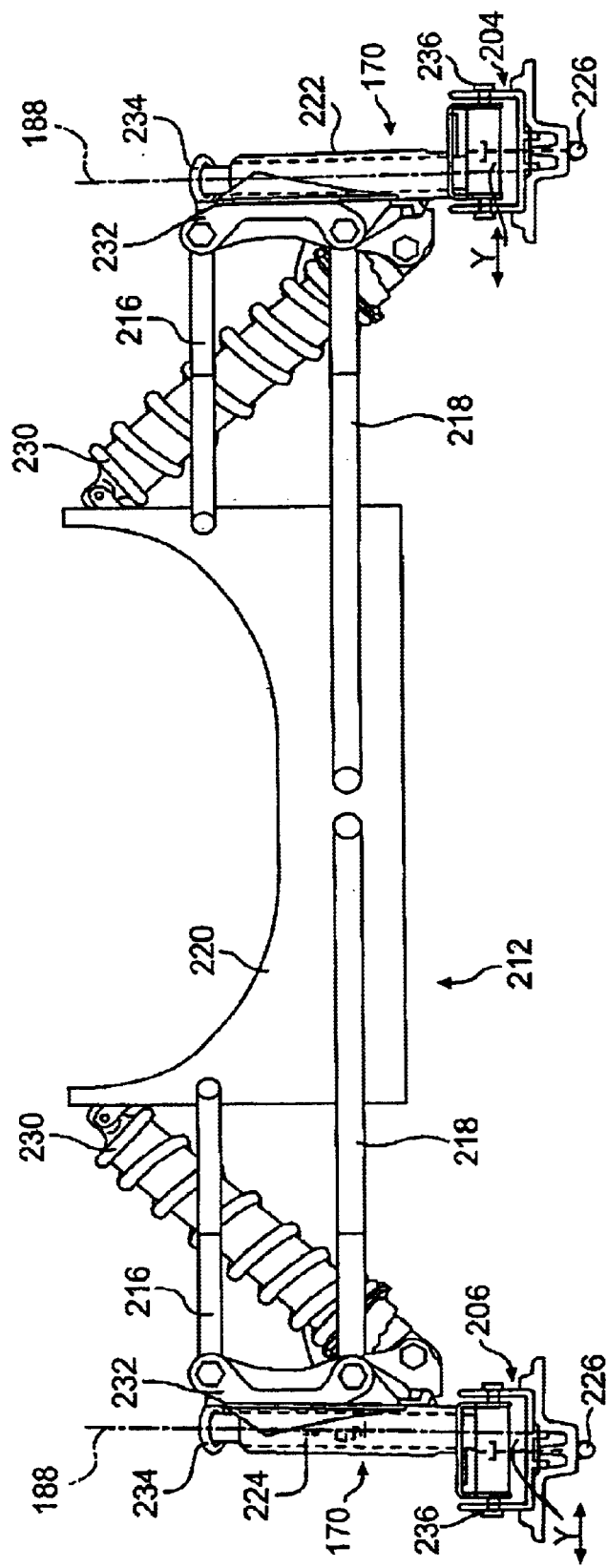
FIG. 10 is a cross-sectional view of a second orientation of the first embodiment of the present invention, shown installed on the front suspension of a snowmobile with the first variation of the skis attached thereto.
Figure 11:
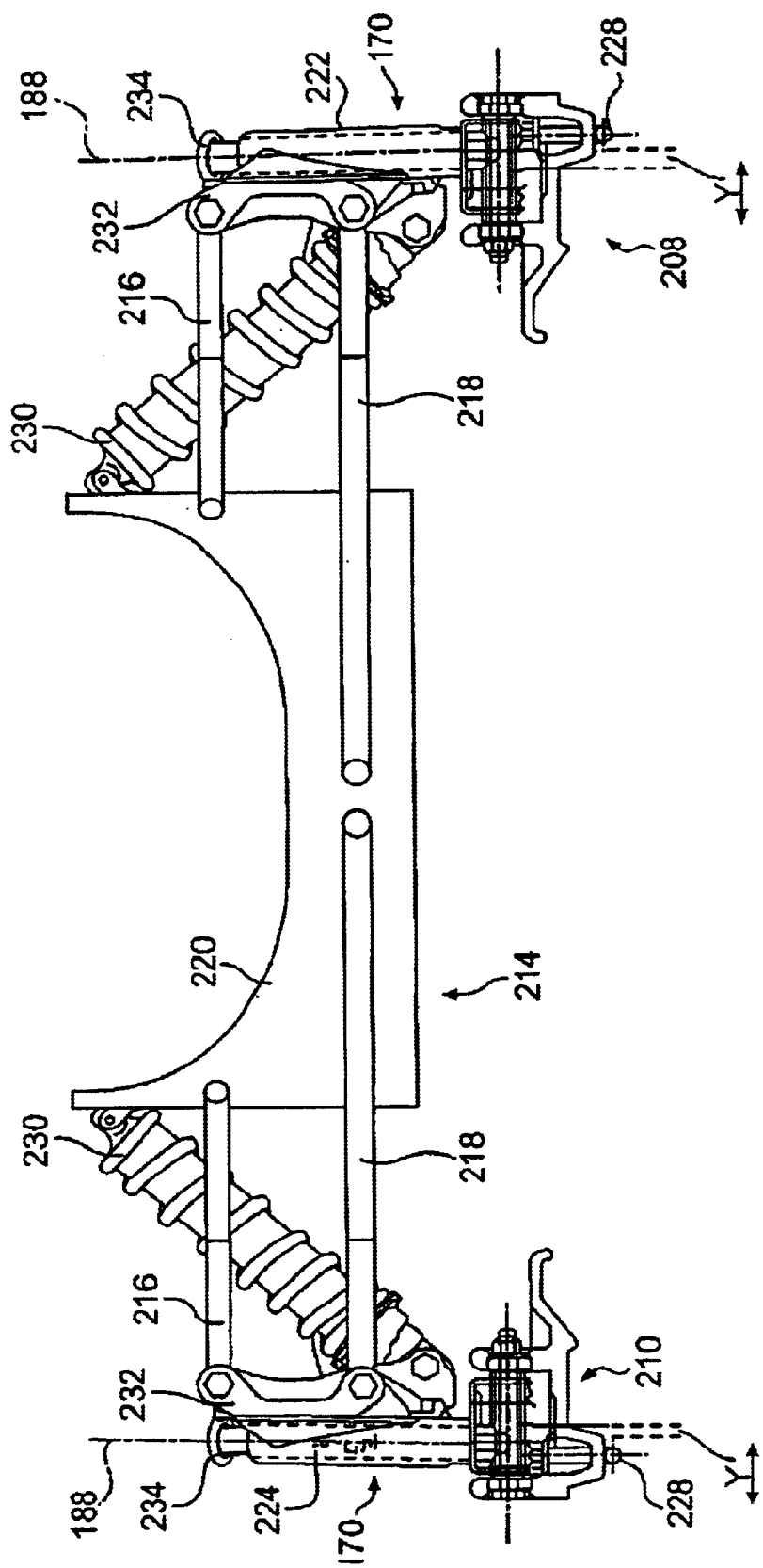
FIG. 11 is a cross-sectional view of a first orientation of the first embodiment of the present invention, shown installed on a snowmobile with a second variation of skis attached thereto.
Figure 12:
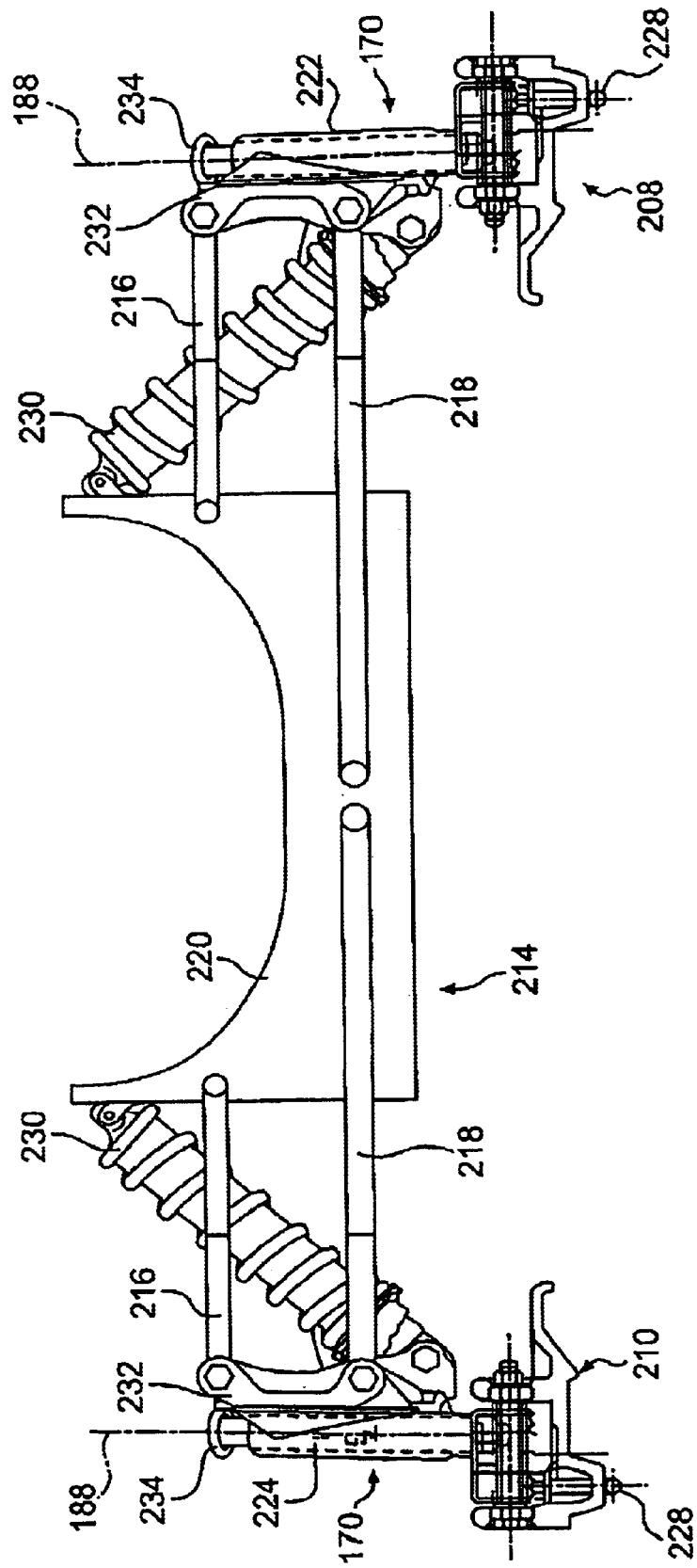
FIG. 12 is a cross-sectional view of a second orientation of the first embodiment of the present invention, shown installed on a snowmobile with a second variation of skis attached thereto.

The operation of the spindle 170 will now be described in connection with FIGS. 9–12, which illustrate the convertibility of the ski stance, using two different skis as examples. FIGS. 9 and 10 illustrate the two possible stances for a snowmobile 10 fitted with standard, single-keeled, groomed-trail skis 204, 206. FIGS. 11 and 12 show the two possible stances for a snowmobile 10 fitted with mountain skis 208, 210. Skis 204, 206 differ from skis 208, 210 in several ways. One significant difference lies in the fact that the skis 204, 206 may be placed on the right side or the left side of the frame 220 without any undesirable consequences to performance. This is due in part to the fact that the skis 204, 206 are symmetrical, and the runners 226 are positioned directly beneath the spindles 170. The skis 208, 210, in contrast, are not symmetrical. Thus, the skis 208, 210 must be installed in a particular orientation to maximize performance of the snowmobile to which they are attached. Preferably, the skis 208, 210 are positioned so that the runners 228 remain on the outside of the axis of rotation 188 of the stems 172 when operating the vehicle.

For simplification, each of FIGS. 9–12 illustrates only portions of the front suspensions 212, 214 on which the skis 204, 206 and 208, 210 are installed. The front suspensions 212, 214 share common elements. The illustrations of the front suspensions 212, 214 provide additional details of the front suspension 22 illustrated for snowmobile 10 depicted in FIG. 1.

In particular, the front suspensions 212, 214 include upper arms 216 and lower arms 218 that are pivotally connected to a frame 220. Left and right spindle holders 222, 224 are disposed at the lateral ends of the upper and lower arms 216, 218. The left and right spindle holders 222, 224 retain the left and right spindles 170 therein. The spindles 170 are rotatable about the axes of rotation 188. Shock absorbers 230 extend between the frame 220 and brackets 232 that are connected to the spindle holders 222, 224.

Referring to FIGS. 9 and 10, the spindles 170 attach to skis 204, 206 in two different ways. FIG. 9 illustrates the first orientation where the skis 204, 206 are oriented to have a narrow stance. FIG. 10 illustrates the second orientation where the skis 204, 206 have a wide stance. Similarly, FIG. 11 illustrates a narrow stance for the skis 208, 210 and FIG. 12 illustrates a wide stance for the same skis.

As indicated above and as shown in FIGS. 9 and 10, the spindle 170 is connected to the skis 204, 206 in two different ways. FIG. 9 shows the spindles 170 connected to the skis 204, 206 on each side of the frame 220 such that the distance measured between the runners 226 (known as the ski stance) is approximately 36 inches. As indicated above, this configuration is considered to be a "narrow stance." FIG. 10 shows the spindles 170 connected to the skis 204, 206 on each side of the frame 220 such that the distance measured between the runners 226 is approximately 38½ inches. This configuration is also known as the "wide stance." The difference between the narrow stance shown in FIG. 9 and the wide stance shown in FIG. 10 is equal to 4 times the distance "Y," which is the desired off set between the axis of rotation 188 of the stem 172 and the transverse centerline 190.

Switching between the narrow stance and the wide stance with the spindle 170 is very simple when using symmetrical skis, such as the skis 204, 206. First, one detaches the spindles 170 from the steering arms 234. Second, the skis 204, 206 are removed from the spindles 170 by removing the nuts and bolts 236 at the bottoms of the spindles 170. Third, the spindles 170 are rotated by 180 degrees about the axis of rotation 188 of the stems 170. Fourth, the skis 204, 206 are reattached to the spindles 170 in the rotated orientation. Performing these steps on the right and left sides of the frame 220, replacing the nut and bolt 236, and reattaching the steering arms 234, creates the wider stance, such as that shown in FIG. 10.

The same process may be used to alter the stance of the skis 208, 210, as illustrated in FIGS. 11 and 12.

Alternatively, as would be appreciated by those skilled in the art, in the case where the skis are symmetrical, such as skis 204, 206, the skis 204, 206 need not be detached from the spindles 170. Instead, the spindles 170 can be swapped from right to left while the skis 204, 206 remain attached to the spindles.

Regardless of the symmetry of the ski used, the ski stance can be altered to improve the characteristics of the snowmobile 10 shown in FIG. 1 without further modification to the components of the suspension system.

Figure 13:
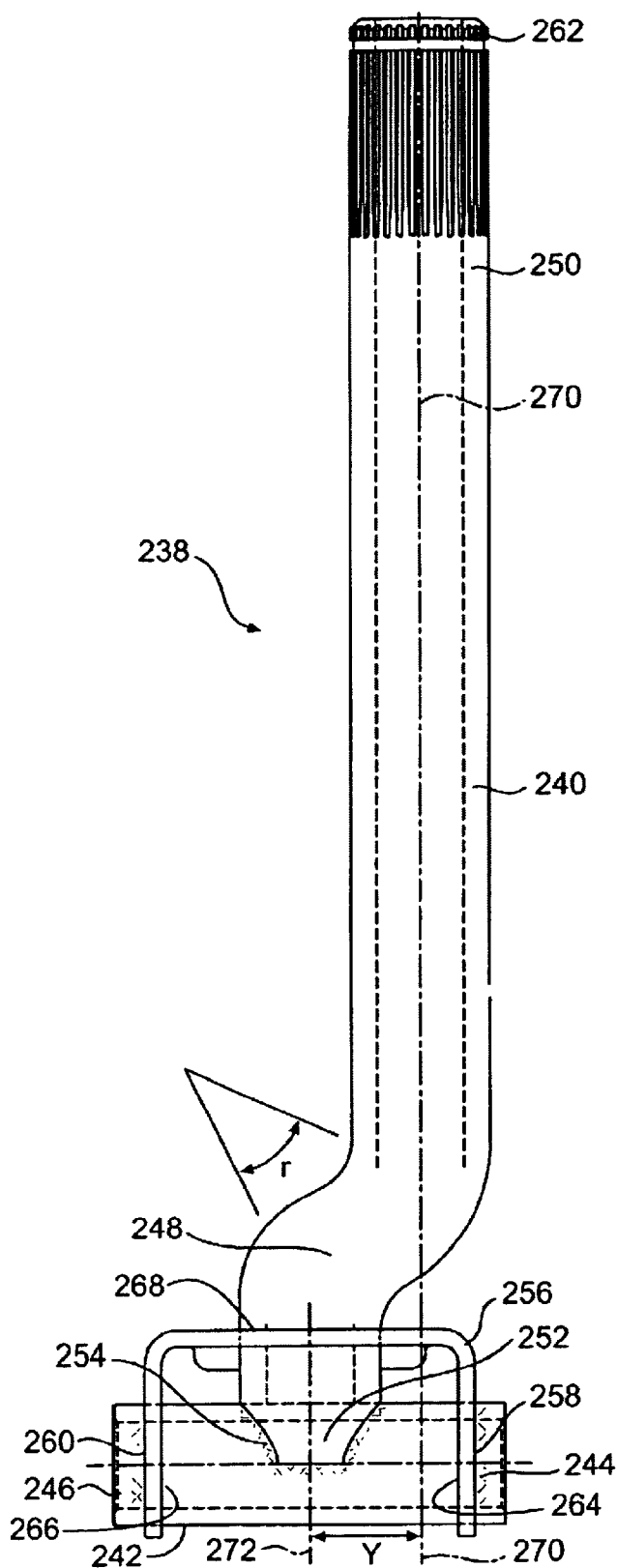
FIG. 13 is a front view of a second embodiment of the spindle of the present invention.

FIG. 13 illustrates a second embodiment of the present invention. In this drawing, the spindle 238 is constructed with a stem 240 that is attached at the centerline of the tubular member 242 between the first and second ends 244, 246. In this embodiment, the stem 240 includes an S-shaped bend 248 at a point along its length between the top portion 250 and the bottom portion 252. The S-shaped bend 248 has a radius of curvature r. Preferably, the S-shaped bend 248 is closer to the bottom portion 252 than the top portion 250 so that it does not interfere with turning of the spindle 238 when installed on a snowmobile, such as the one illustrated in FIG. 1.

As with the spindle 170 illustrated in FIGS. 7 and 8, the bottom portion 252 of the spindle 238 is preferably connected to the tubular portion 242 via a weld 254 (or some other suitable connector). Similarly, the bracket 256 preferably is connected to the tubular member via welds 258, 260. Of course, any other suitable connector could be used instead. As with the previous embodiment, the top portion 250 of the spindle 238 includes a plurality of serrations 262.

As with the spindle 170 illustrated in FIGS. 7 and 8, the bracket 256 preferably includes three holes to facilitate attachment of the stem 240, tubular member 242 and the bracket 256 together. A first hole 264 is disposed through one side of the bracket 256. A second hole 266 is disposed through the other side of the bracket 256. A third hole 268 is disposed through the top portion of the bracket 256.

The S-shaped bend 248 enables the axis of rotation 270 to be offset from the transverse centerline 272 of the tubular member 242 so that the stance of the snowmobile may be adjusted to accommodate specific riding conditions. As in the previous spindle 170, the offset distance is illustrated as Y as is preferably within the range of about 0 to 25 mm, more preferably within the range of about 5 to 20 mm, and most preferably about 16 mm.

In the preferred embodiment of the spindle 238, the stem 240 is cylindrical in cross-section. This facilitates rotation of the stem 240. The radius r of the S-shaped bend 248 depends on the offset Y desired. As would be recognized by one skilled in the art, the greater the degree of radius r, the greater the degree of offset Y.

As would be recognized by one skilled in the art, both the spindles 170 and 238 are designed to be used with a swing-arm type suspension system such as that shown in FIGS. 9–12. Alternatively, the spindles 170, 238 could not be used in combination with the suspension illustrated in FIG. 19.

Figure 14:
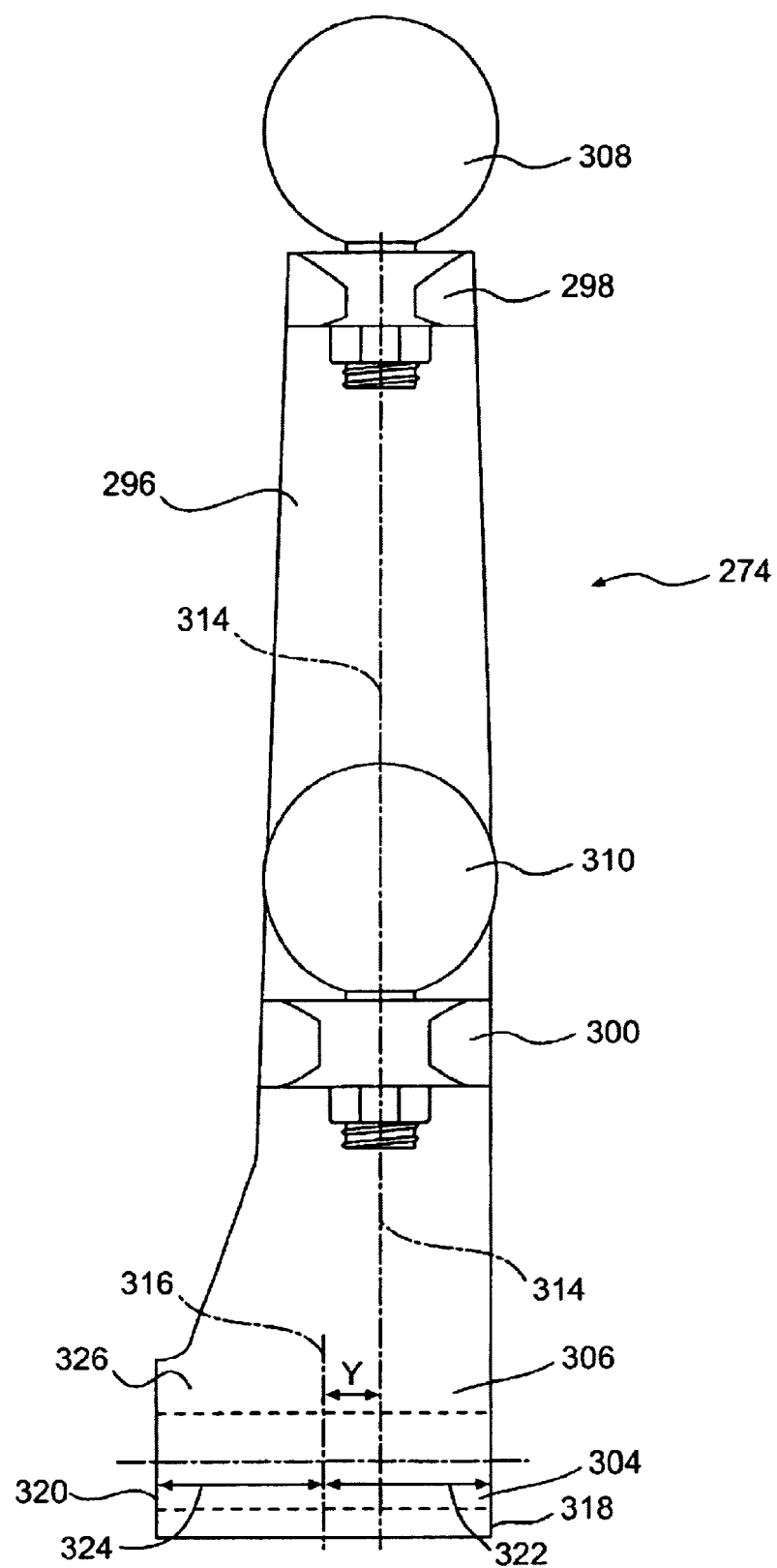
FIG. 14 is a front view of a ski leg according to a third embodiment of the present invention.
Figure 15:
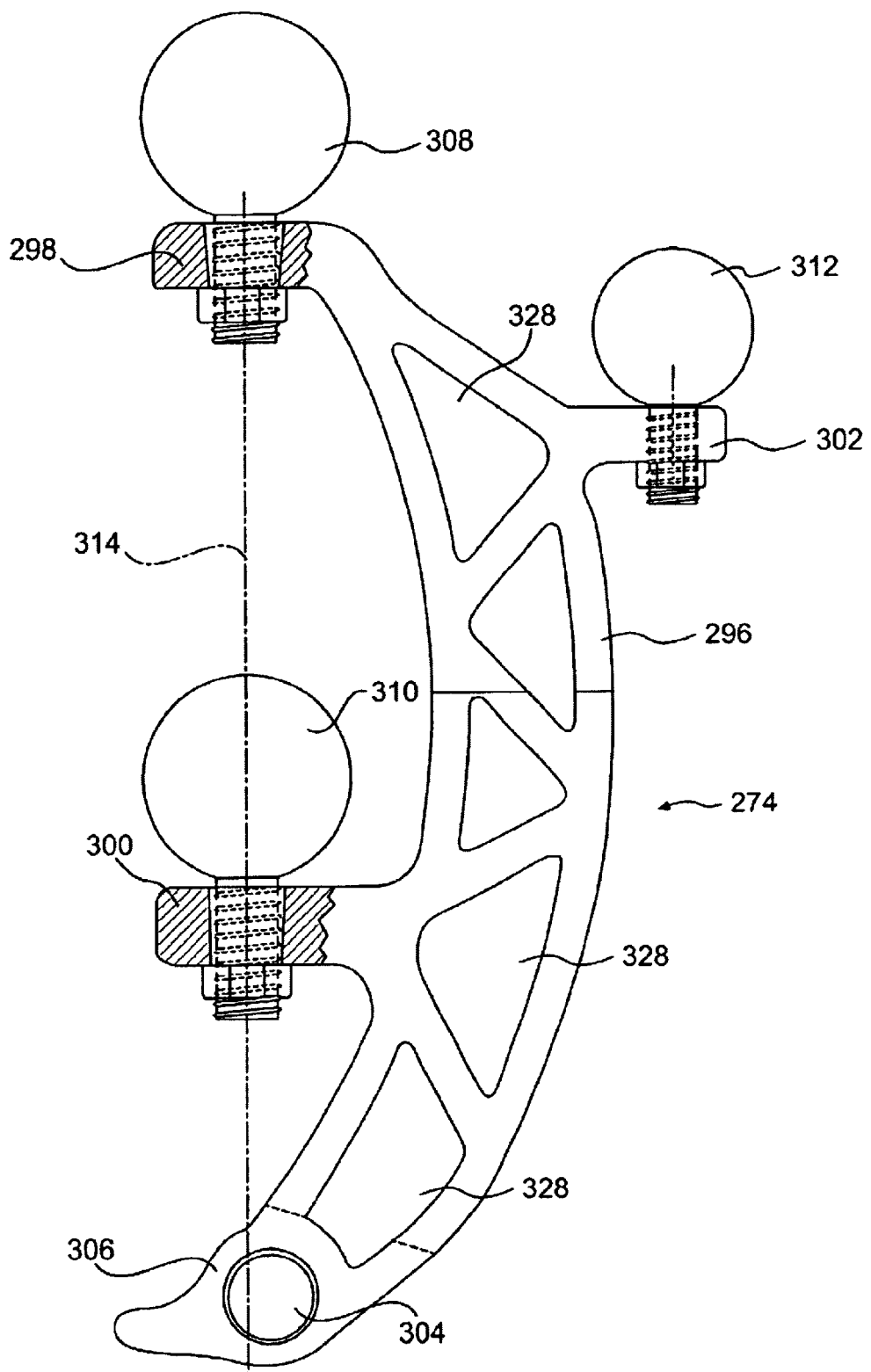
FIG. 15 is a left side view of the ski leg illustrated in FIG. 14.
Figure 19:
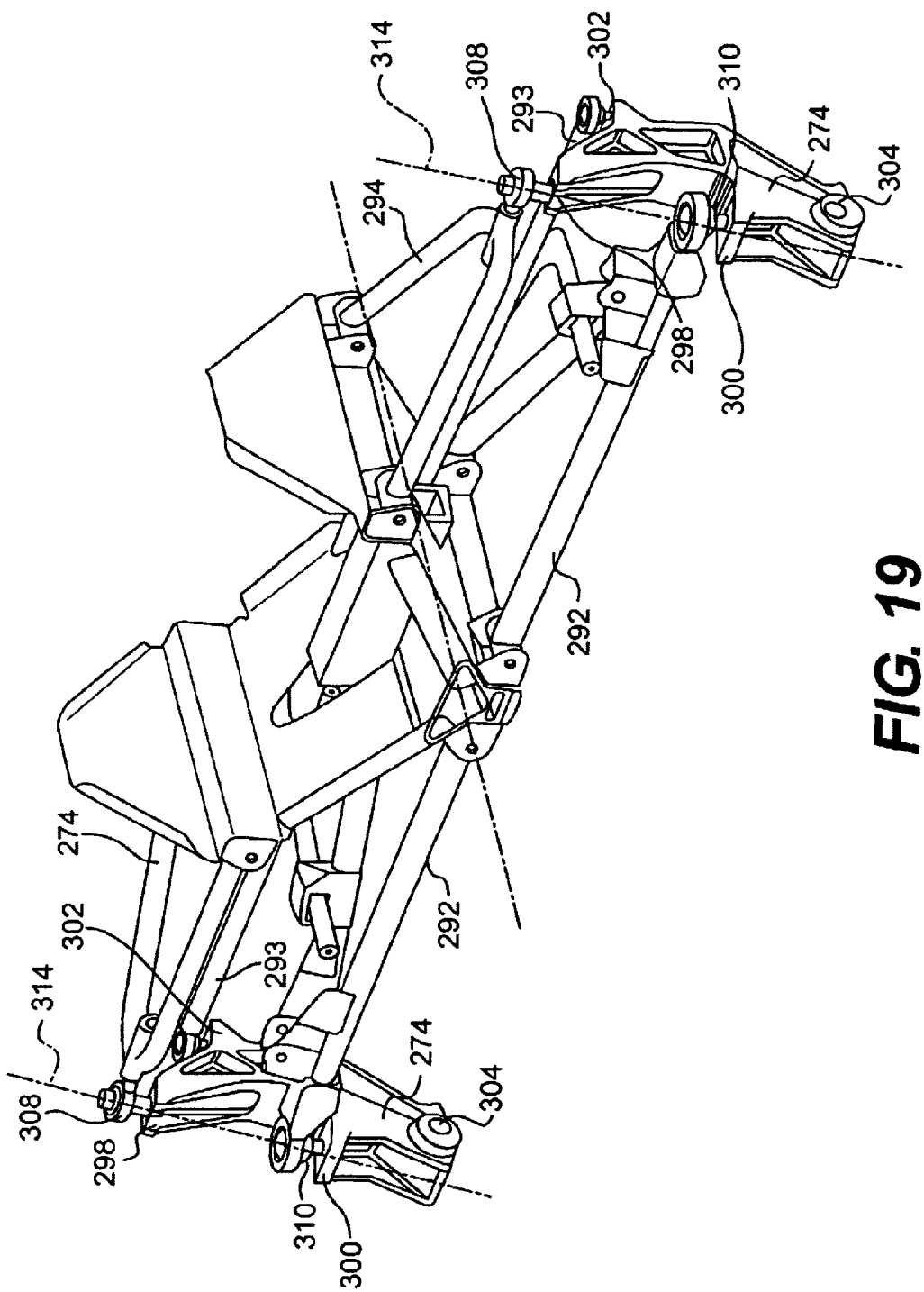
FIG. 19 is a front, left perspective view of a double A-arm type front suspension system, including the ski leg of the present invention that is illustrated in FIG. 14.

FIGS. 14 and 15 illustrate a ski leg 274 constructed according to the present invention. The ski leg 274 is designed specifically to be used in connection with a double A-arm suspension as illustrated in FIG. 19. The ski leg 274 is constructed to include an offset Y just as in the previous embodiments. The term "ski leg" has been adopted for identification of this particular component of the present invention. As would be understood by those skilled in the art, however, the "ski leg" is simply a modified spindle, as discussed above. Therefore, the terms "spindle" and "ski leg" may be considered as synonymous in the discussion that follows.

The ski leg 274 preferably is made of aluminum. In particular, the ski leg 274 preferably is made as a unitary, one-piece, aluminum extrusion. Aluminum is preferred because it may be extruded easily. Also, aluminum is light in weight by comparison with other materials and, therefore, does not add significantly to the overall weight of the snowmobile to which it is attached. Of course, other materials may be substituted therefor without deviating from the scope of the present invention. For example, the ski leg 274 may be made from steel or, perhaps, a composite material.

Figure 20:
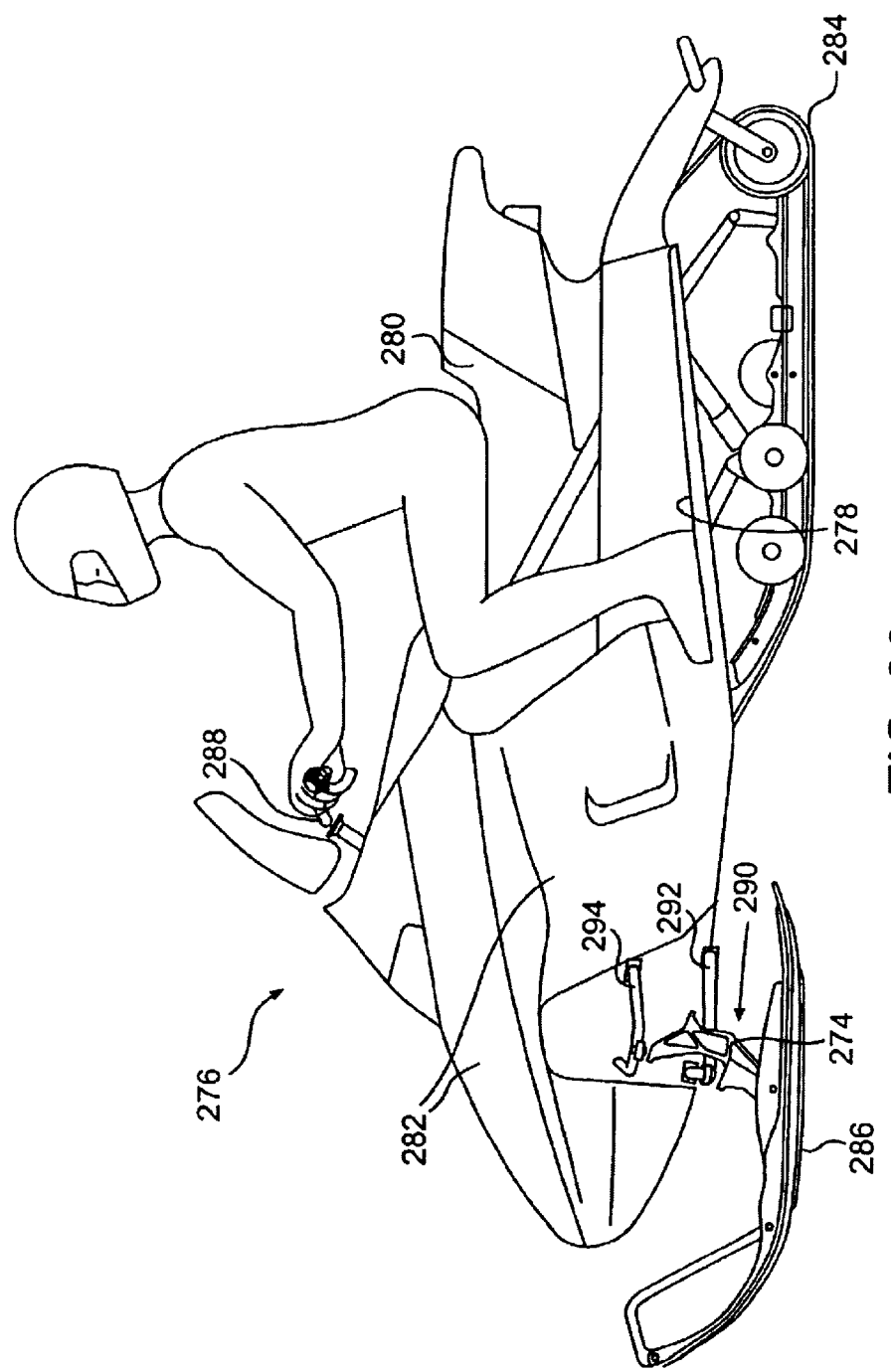
FIG. 20 is a left side view schematic illustration of a third snowmobile according to the present invention, which is also manufactured by Bombardier Inc. of Montreal, Quebec, Canada.

A schematic illustration of the type of snowmobile on which the ski leg 274 is incorporated is provided in FIG. 20. The snowmobile 276 includes a frame 278 on which a seat 280 is disposed. The frame 276 is powered by an engine (not shown) that is disposed beneath the fairings 282 at the front of the vehicle. An endless track 284 is disposed beneath the frame 278 and is operatively connected to the engine to propel the snowmobile 276. Two skis 286 are disposed at the front of the snowmobile 276. The two skis are operatively connected to the handlebars 288 so that the snowmobile 276 may be steered. The ski legs 274 are connected to a front suspension system 290 that includes upper and lower A-arms 292, 294. The upper and lower A-arms 292, 294 are connected to the frame 278 of the snowmobile 276.

As illustrated in FIG. 20, the ski legs 274 extend downwardly to the skis 286 from the front suspension 290.

The ski legs 274 include an elongated body portion 296 with upper and lower forwardly-extending protrusions 298, 300. The elongated body 296 also includes a rearwardly-extending protrusion 302. The ski leg 274 also includes a hole 304 near the bottom portion 306 thereof. The hole 304 extends through the bottom portion 306 to permit the ski leg 274 to pivot with respect to the ski 286 attached thereto.

As illustrated in FIGS. 15 and 19, the forwardly-extending protrusions 298, 300 are adapted to be connected to the upper and lower A-arms 292, 294, respectively. The rearwardly-extending portion 302 is adapted to be connected to a steering arm 293 so that the ski leg 274 may be rotated to steer the snowmobile 276. Preferably, the connection between the A-arms 292, 294 and the forwardly-extending protrusions 298, 300 and the connection between the steering arm and the rearwardly-extending portion 302 are via ball joints 308, 310, 312. Ball joint connections permit the ski leg 274 to rotate about an axis of rotation 314.

The axis of rotation 314 of the ski leg 274 is offset from the transverse centerline 316 of the ski 286 by a preset distance Y. As discussed above, the preset distance Y preferably is within the range of about 0 to 25 mm, more preferably within the range of about 5 to 20 mm, and most preferably about 16 mm. As indicated above, the transverse centerline 316 marks approximately the center point of the ski 286 if the ski 286 is symmetrical. Alternatively, the transverse centerline 316 is defined as the approximate center point between first and second sides 318, 320 of the lower portion 306 of the ski leg 274. In other words, the distances 322, 324 are approximately equal to one another.

As shown in FIGS. 14 and 15, the axis of rotation 314 of the ski leg 274 passes through the centers of the upper and lower ball joints 308, 310. Since the side 320 preferably is the interior side of the ski leg 274, the transverse centerline 316 is offset by the distance Y toward the body of the snowmobile 276. FIG. 14, therefore, illustrates the left ski 286 for the snowmobile 276. This is the narrower stance for the skis 286.

To produce a wide stance with the ski leg 274, there are several steps that must be followed. First, the ski leg must be detached from the front suspension 290 of the snowmobile 276. This is accomplished by decoupling the ski leg 274 from the three ball joints 308, 310, 312. Next, the right and left ski legs 274 are swapped for one another and reinstalled on the snowmobile 276. If the skis 286 are not symmetrical, an additional step is required that the skis 286 must be swapped for one another to maintain the proper orientation on the front suspension 290.

The offset for the ski leg 274 is accomplished by providing the lower portion 306 of the ski leg 274 with a protuberance 326. In the embodiment illustrated in FIG. 14, the protuberance 326 extends toward the inside portion of the ski leg 274, thereby decreasing the ski stance of the snowmobile 276. In this embodiment, the protuberance 326 is integrally formed as a part of the ski leg 274. As would be appreciated by those skilled in the art, however, the protuberance 326 need not be formed as a part of the lower portion 306 of the ski leg 274.

The ski leg 274 includes a plurality of holes 328 disposed therethrough. The holes 328 lighten the weight of the ski leg 274. Furthermore, the holes 328 are shaped so that they do not reduce the overall strength and rigidity of the ski leg 274.

FIGS. 16–18 depict one possible alternative to the ski leg 274 illustrated in FIGS. 14 and 15. Here, the ski leg 330 incorporates a spacer 332 to effectuate the offset so that the ski stance of the snowmobile (such as snowmobile 276) may be altered.

FIGS. 16 and 17 provide a front elevational view of the ski leg 330. As shown, the ski leg 330 includes indented portions 334 on either side thereof. The indented portions 334 are shaped to accommodate a spacer 332 but are not required to practice the present invention.

As with the previous embodiment of the ski leg 274, the ski leg 330 includes a body 336 with upper and lower protrusions 338, 340. The upper and lower protrusions 338, 340 connect to the upper and lower A-arms 292, 294 on the snowmobile 276. The ski leg 330 also includes a rearward projection (not illustrated) that connects to the steering arm. A hole 342 extends through the lower portion 344 of the ski leg 330.

The ski leg 330 has an axis of rotation 346 that passes through the ball joints (not shown) that are connected to the protrusions 338, 340, just as with ski leg 274. When a spacer 332 is attached to the bottom portion 344 of the ski leg 330, a transverse centerline 348 is established that is offset from the axis of rotation 346 by a distance Y. As in the previous examples, the distance Y preferably is within the range of about 0 to 25 mm, more preferably within the range of about 5 to 20 mm, and most preferably about 16 mm.

The spacer 332, a detailed view of which is provided in FIG. 18, includes a central hole 350 and two further holes 352, 354 disposed radially from the central hole 350. The spacer 332 also has a width w, which corresponds to the appropriate width to be added to the ski leg 330. As illustrated in FIGS. 16 and 17, the spacer 332 may be attached to either side of the ski leg 330 with two bolts 356, 358, which extend through the holes 352, 354.

Preferably, the spacer 332 is made from a material that is light in weight such as aluminum. However, since the spacer bears very little of the structural weight of the snowmobile, 276, it may alternatively be made of a material such as plastic or steel.

Changing the ski stance of a snowmobile fitted with ski legs 330 is simpler than the same operation for a snowmobile fitted with ski legs 274. With ski legs 330, the skis 286 must be removed. Next, the spacer must be moved from the interior surface of the ski leg 330 (FIG. 16) to the exterior surface (FIG. 17). The ski 286 may then be replaced onto the ski leg 330 in the same orientation.

While the invention has been described with reference to several preferred embodiments, it will be understood by those skilled in the art that various changes may be made and equivalents may be substituted for elements thereof without departing from the spirit and scope of the present invention. In addition, many modifications may be made to adapt a particular situation, component, or material to the teachings of the present invention without departing from its teachings as claimed.

What is claimed is:

1. A snowmobile, comprising:
   a frame having a right side, a left side, and a centerline;
   right and left suspension assemblies pivotally connected to right and left sides of the frame respectively; and
   right and left spindles rotatably connected to the right and left suspension assemblies respectively, each spindle in an initial orientation, each spindle having an upper portion and a lower portion,
   wherein the upper portion of each spindle defines an axis of rotation,
   wherein the lower portion of each spindle has a transverse centerline offset from the axis of rotation;
   wherein the distance between the transverse centerline of the right spindle and the transverse centerline of the left spindle is alterable by at least one of (1) rotation of the right and left spindles by 180° and (2) swapping of the right and left spindles for one another while each is kept in said initial orientation.

2. The snowmobile of claim 1, wherein the transverse centerlines are positioned approximately equidistant between right and left sides of the lower portions of the spindles.

3. The snowmobile of claim 2, wherein the upper and lower portions of the spindles are tubular members connected perpendicularly to one another.

4. The snowmobile of claim 3, wherein:
   the upper and lower portions are straight tubular members, and
   the upper member connects to the lower member at a position that defines the offset between the axis of rotation and the transverse centerline.

5. The snowmobile of claim 2, wherein:
   the upper member connects to the lower member at the location of the transverse centerline and the upper member includes a bend therein to offset the axis of rotation from the transverse centerline.

6. The snowmobile of claim 1, wherein the axis of rotation is offset from the transverse centerline by distance between about 0 to 25 mm.

7. The snowmobile of claim 6, wherein the axis of rotation is offset from the transverse centerline by distance between about 5 to 20 mm.

8. The snowmobile of claim 7, wherein the axis of rotation is offset from the transverse centerline by a distance of about 16 mm.

9. A ski leg for a snowmobile comprising:
   an elongated body having upper and lower portions, a front side, a rear side, a left side, and a right side, the lower portion suitable for connection to a snowmobile ski;
   a first protrusion projecting from the upper portion front side of the body, wherein the first protrusion is suitable for connection to an upper suspension assembly;
   a second protrusion projecting from the lower portion front side of the body, wherein the second protrusion is unable for connection to a lower suspension assembly; and
   a third protrusion projection from the rear side of the elongated body, wherein the third protrusion is suitable for connection to a steering arm;
   wherein the first and second protrusions define an axis of rotation passing therethrough, and
   wherein the lower portion of the elongated body includes a transverse centerline that is offset from the axis of notation to one of the left side and the right side of the elongated body by a redetermined distance.

10. The ski leg of claim 9, wherein the transverse centerline is positioned approximately equidistantly between the right and left sides.

11. The ski leg of claim 10, further comprising:
    at least one spacer attached to one of the left side and the right side of the lower portion of the right ski leg;
    at least one spacer attached to one of the left side and the right side of the lower portion of the left ski leg;
    wherein the distance between the transverse centerline of the right ski leg and transverse centerline of the left ski leg may be altered by switching the at least one spacer of the right ski leg to the other of the left side and the right side of the lower portion of the right ski leg and switching the at least one spacer of the left ski leg to the other of the left side and the right side of the lower portion of the left ski leg.

12. The ski leg of claim 10, wherein one of either the right or left sides of the lower portion of the elongated body extends outwardly from the elongated body a distance greater than the other of the right and left sides to offset the transverse axis from the axis of rotation.

13. The ski leg of claim 9, wherein the axis of rotation is offset from the transverse centerline by a distance between about 0 to 25 mm.

14. The ski leg of claim 13, wherein the axis of rotation is offset from the transverse centerline by a distance between about 5 to 20 mm.

15. The ski leg of claim 14, wherein the axis of rotation is offset from the transverse centerline by a distance of about 16 mm.

16. A snowmobile, comprising:

a frame having a right side, a left side, and a centerline;

right and left suspension assemblies pivotally connected to right and left sides of the frame respectively;

right and left ski legs rotatably connected to the right and left suspension assemblies respectively, each ski leg has upper and lower portions, a front side, a rear side, a left side, and a right side, the lower portion suitable for connection to a snowmobile ski;

a first protrusion projecting from the upper portions front side of each ski leg, wherein the first protrusion is suitable for connection to an upper suspension assembly;

a second protrusion projecting from the lower portion, front side of each ski leg, wherein the second protrusion is suitable for connection to a lower suspension assembly; and a third protrusion projection from the rear side of each ski leg, wherein the third protrusion is suitable for connection to a steering arm;

wherein the first and second protrusions define an axis of rotation passing therethrough, wherein the lower portion of the ski leg includes a transverse centerline that is offset from the axis of rotation to one of the left side and the right side of the ski leg by a predetermined distance, and wherein the distance between the transverse centerline of the right ski leg and the transverse centerline of the left ski leg may be altered by swapping of the right and left ski legs for one another while being kept in their initial orientations.

17. The snowmobile of claim 16, further comprising:

at least one spacer attached to one of the left side and the right side of the lower portion of the right ski leg;

at least one spacer attached to one of the left side and the right side of the lower portion of the left ski leg;

wherein the distance between the transverse centerline of the right ski leg and transverse centerline of the left ski leg may be altered by switching the at least one spacer of the right ski leg to the other of the left side and the right side of the lower portion of the right ski leg and switching the at least one spacer of the left ski leg to the other of the left side and the right side of the lower portion of the left ski leg.

18. The snowmobile of claim 16, further comprising:

a first ski including a first runner attached to the underside thereof, the first ski being connected to the lower portion of the right ski leg; and a second ski including a second runner attached to the underside thereof, the second ski being connected to the lower portion of the left ski leg, wherein the transverse axis of the right ski leg intersects the first runner of the first ski and the transverse axis of the left ski leg intersects the second runner of the second ski.

* * * * *